US012631900B2

(12) United States Patent
Tharrett et al.

(10) Patent No.: US 12,631,900 B2
(45) Date of Patent: May 19, 2026

(54) HINGE ASSEMBLY FOR EYEWEAR, EYEWEAR COMPRISING SUCH A HINGE ASSEMBLY AND METHOD FOR ASSEMBLING SUCH A HINGE ASSEMBLY

(71) Applicant: ESSILOR INTERNATIONAL, Charenton-le-pont (FR)

(72) Inventors: Dallas Tharrett, Mason, OH (US); Bennett Nadeau, Austin, TX (US); Matt Storey, Austin, TX (US)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 0 days.

(21) Appl. No.: 18/778,485

(22) Filed: Jul. 19, 2024

(65) Prior Publication Data

US 2025/0028187 A1     Jan. 23, 2025

(30) Foreign Application Priority Data

Jul. 20, 2023    (EP) ..................................... 23186794

(51) Int. Cl.
    *G02C 5/22*         (2006.01)
(52) U.S. Cl.
    CPC ....... *G02C 5/2236* (2013.01); *G02C 2200/26* (2013.01)
(58) Field of Classification Search
    CPC .. G02C 5/2236; G02C 5/2245; G02C 200/26; G02C 200/28; G02C 13/001; G02B 27/0176; G02B 2027/0178
    See application file for complete search history.

(56) References Cited

U.S. PATENT DOCUMENTS 2,874,609 A  *   2/1959   Ducati ................... G02C 5/146
                                                   351/113
3,644,023 A  *   2/1972   Villani ................. G02C 5/2227
                                                   351/113

(Continued)

FOREIGN PATENT DOCUMENTS

CN        107797303 A     3/2018
EP          2163938 A1     3/2010
WO     2021211336 A1   10/2021

OTHER PUBLICATIONS

European Search Report for Application No. 23186794.6, dated Jan. 5, 2024, 9 pages.

*Primary Examiner* — William L Miller
(74) *Attorney, Agent, or Firm* — CANTOR COLBURN LLP

(57)             ABSTRACT

A hinge assembly for eyewear includes an anchor element configured to be applied to a front of eyewear; an anchor box configured to be applied to a temple, the anchor box has at least one housing chamber with an inner retaining member; at least one hinging member with at least one end portion rotatably coupled to the anchor element and at least one shaft portion ending with at least one head portion; at least one elastic element passed through by at least one respective shaft-like shaped portion and, from one side, in contact with the inner retaining member and, from the other side, in contact with the at least one head portion; wherein the hinge assembly reversibly passes from a first stable opening position to a second stable closing position and vice versa and from the first stable opening position to a third unstable overtravel position and vice versa.

16 Claims, 30 Drawing Sheets

(56) References Cited

U.S. PATENT DOCUMENTS

| | | | | |
|---|---|---|---|---|
| 4,494,834 | A * | 1/1985 | Tabacchi | G02C 5/2245 |
| | | | | 351/113 |
| 5,165,060 | A * | 11/1992 | Huang | G02C 5/146 |
| | | | | 351/113 |
| 5,406,339 | A * | 4/1995 | Chen | G02C 5/2236 |
| | | | | 351/113 |
| 5,751,393 | A * | 5/1998 | Yamazaki | G02C 5/2227 |
| | | | | 351/63 |
| 5,755,010 | A * | 5/1998 | Lehnert | G02C 5/2236 |
| | | | | 351/113 |
| 5,889,575 | A * | 3/1999 | Wang | G02C 5/2245 |
| | | | | 351/113 |
| 8,302,259 | B2 * | 11/2012 | Wannenmacher | G02C 5/2245 |
| | | | | 16/228 |
| 8,533,913 | B2 * | 9/2013 | Buchegger | G02C 5/2209 |
| | | | | 16/228 |
| 8,978,204 | B2 * | 3/2015 | Hotellier | G02C 5/2254 |
| | | | | 16/228 |
| 10,642,065 | B2 * | 5/2020 | Montalban | G02C 5/2245 |
| 10,795,179 | B2 * | 10/2020 | Montalban | G02C 5/2236 |
| 10,928,651 | B2 * | 2/2021 | Montalban | G02C 5/2245 |
| 11,435,590 | B2 * | 9/2022 | Moore | G06F 1/1681 |
| 11,543,679 | B2 * | 1/2023 | Ryner | G02C 5/2245 |
| 11,662,605 | B2 * | 5/2023 | Dal Pont | G02C 5/16 |
| | | | | 351/121 |
| 12,111,515 | B2 * | 10/2024 | Ryner | G02B 27/0176 |
| 12,259,595 | B2 * | 3/2025 | Ryner | G02C 5/2218 |
| 12,353,063 | B2 * | 7/2025 | Dal Pont | G02C 5/2236 |
| 12,372,806 | B2 * | 7/2025 | Guentert | G02C 5/2227 |
| 12,372,807 | B2 * | 7/2025 | Ryner | G02C 5/2227 |
| 2005/0217073 | A1 * | 10/2005 | Wagner | G02C 5/2236 |
| | | | | 16/255 |
| 2007/0089268 | A1 | 4/2007 | Genelot | |
| 2016/0116761 | A1 * | 4/2016 | Sbardella | G02C 5/2245 |
| | | | | 351/153 |
| 2016/0377883 | A1 * | 12/2016 | Montalban | G02C 5/2281 |
| | | | | 351/178 |
| 2019/0162983 | A1 | 5/2019 | Montalban | |
| 2021/0263335 | A1 * | 8/2021 | Dal Pont | G02C 5/22 |
| 2023/0033269 | A1 | 2/2023 | Dal Pont | |
| 2023/0063509 | A1 * | 3/2023 | Wang | G02C 5/2227 |
| 2023/0089746 | A1 | 3/2023 | Ryner et al. | |
| 2023/0314833 | A1 * | 10/2023 | Adema | G02C 5/2236 |
| | | | | 351/114 |
| 2023/0350225 | A1 * | 11/2023 | An | G02C 11/10 |
| 2024/0353691 | A1 * | 10/2024 | Wang | G02C 5/2254 |
| 2024/0402516 | A1 * | 12/2024 | Li | G02C 5/22 |
| 2025/0085568 | A1 * | 3/2025 | Fuzette | G02C 5/2227 |
| 2025/0341733 | A1 * | 11/2025 | Dal Pont | G02C 5/2236 |
| 2025/0347930 | A1 * | 11/2025 | Dal Pont | G02C 11/10 |

* cited by examiner

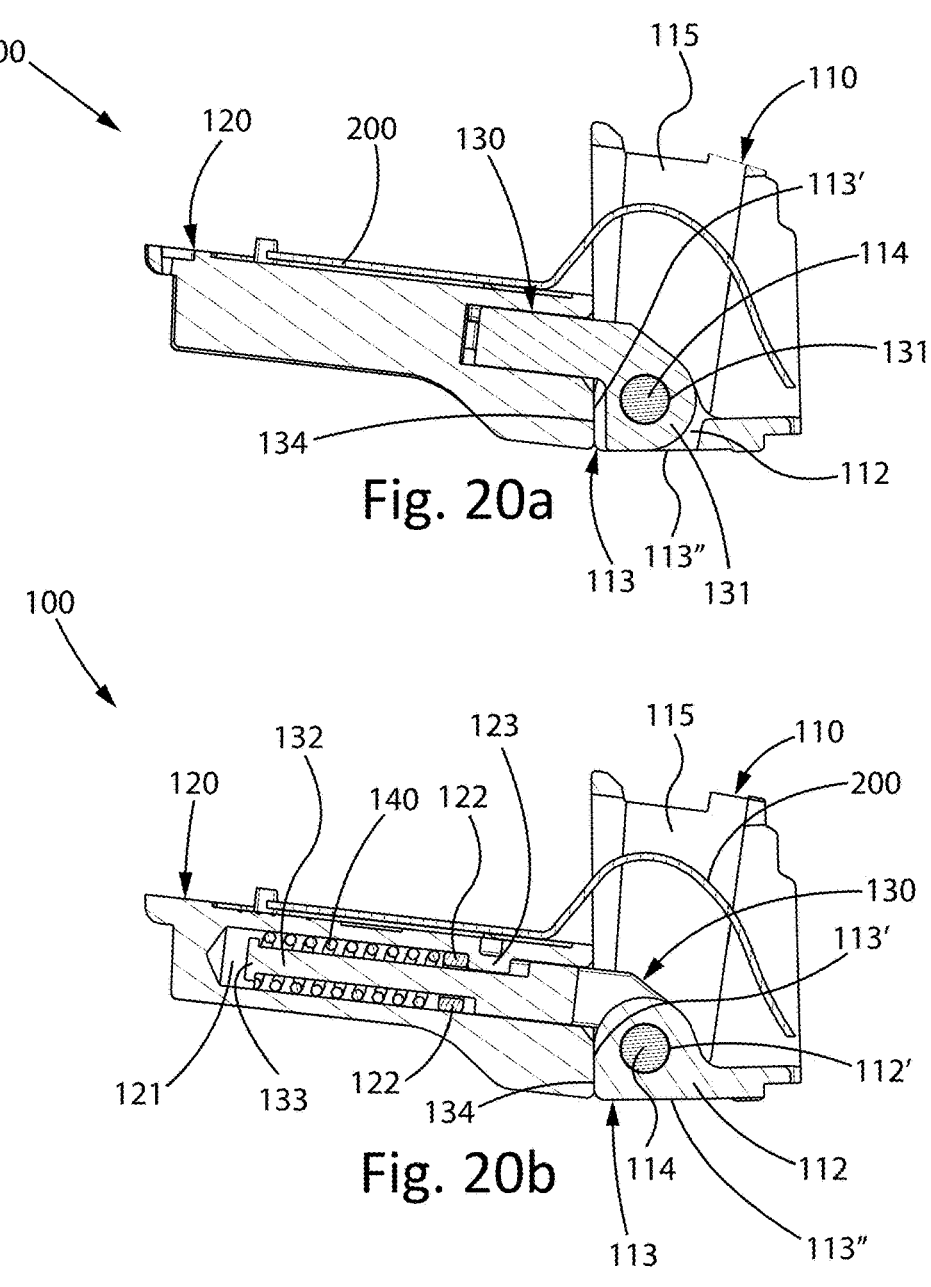
Fig. 20a
Fig. 20b
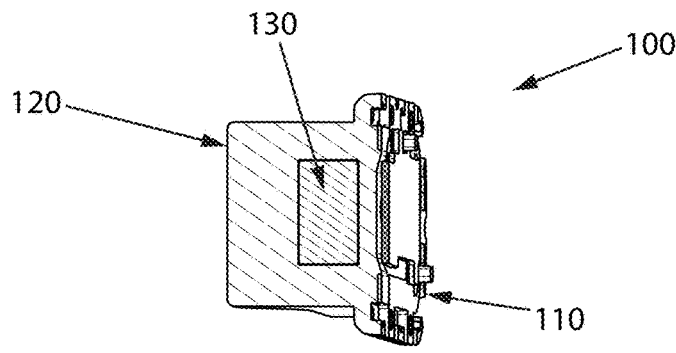
Fig. 20c

HINGE ASSEMBLY FOR EYEWEAR, EYEWEAR COMPRISING SUCH A HINGE ASSEMBLY AND METHOD FOR ASSEMBLING SUCH A HINGE ASSEMBLY

CROSS-REFERENCE TO RELATED APPLICATIONS

This application claims the benefit of European patent application 23186794.6, filed on 20 Jul. 2023, the disclosure of which is incorporated herein by reference in its entirety.

TECHNICAL FIELD

The present disclosure refers to a hinge assembly for eyewear, particularly but not exclusively usable in smart eyewear.

The present disclosure refers also to eyewear comprising such a hinge assembly.

The present disclosure also relates to a method for assembling such a hinge assembly.

Although such a hinge assembly can be used in all kinds of eyewear, for the sake of simplicity, for exemplary and not limiting purposes, the present description will focus only on smart eyewear.

BACKGROUND

As known, smart eyewear comprise electronic devices adapted to operate as an electronic calculator able to support the activities carried out by the user wearing them.

In more details, the electronic devices are able to play audio and video, launch and run software application, recognize shapes and objects placed in the surrounding environment.

Smart eyewear might comprise a display integrated into the lenses, and a processing and control unit integrated into the spectacle frame or temples.

Moreover, the display and the processing and control unit are electrically connected by a flexible cable that passes through the hinging area located between the front and the respective temple.

Generally, smart eyewear are provided with an hinge that rotatably couples the front and the respective temple of the eyewear.

In the state of art are known bistable hinges that allow to maintain the temple firm and stable in the operational which it is, that is the opening position or the closing position, preventing the temple to move inadvertently.

In the state of art there are also known hinges that allow reaching an additional operational position of extra-flexible opening, called "overtravel position", in which the angle formed between the respective temple and the front of the eyewear is greater than 90 degrees when the respective temple is open.

These hinges will be named below flexible.

The overtravel position helps the user to wear the eyewear in an easier way, thanks to the extra-opening of the temples.

Usually, the bistability and flexibility of the hinge is given by the interaction of different articulation elements located in the hinging area between the temples and the front.

The known bistable and flexible hinges have certain drawbacks.

A first drawback lies in that these articulation elements are in large number and are connected between each other in a complex way, thus causing possible malfunction and increasing the risk of damage and/or failure, with the consequent difficulty to replace the hinge in short time and effortlessly.

A second drawback lies in that these articulation elements occupy a large space, thus increasing the overall dimension and weight of the hinge and preventing the correct arrangement of the flexible cable in the hinging area when the hinge is integrated in a pair of smart eyewear.

SUMMARY

The present disclosure overcomes the above-mentioned drawbacks and in particular to devise a hinge assembly for eyewear which is simpler and lighter compared to the known art.

This and other advantages according to the present disclosure are achieved by making a hinge assembly for eyewear as set forth in the claims, as well as eyewear comprising such a hinge assembly, and a method for assembling such a hinge assembly as set forth in the claims.

Further characteristics of the hinge assembly for eyewear and eyewear comprising such a hinge assembly are the objects of the dependent claims.

BRIEF DESCRIPTION OF THE DRAWINGS

The characteristics and advantages of a hinge assembly for eyewear and eyewear comprising such a hinge assembly according to the present disclosure will be more evident from the following exemplary though non-limiting description, referring to the attached schematic drawings in which:

FIG. 1b is a top view of the hinge assembly of FIG. 1a;

FIG. 3b is a top view of the hinge assembly of FIG. 3a;

FIG. 5b is a top view of the hinge assembly of FIG. 5a;

FIG. 7b is a top view of the hinge assembly of FIG. 7a;

FIGS. 20a, 20b, 20c are three sectional views respectively along the lines XXa-XXa, XXb-XXb, XXc-XXc of the hinge assembly of FIG. 19;

DETAILED DESCRIPTION OF THE DRAWINGS

With reference to the figures, a hinge assembly is shown, globally referred to as 100.

Figure 1A:
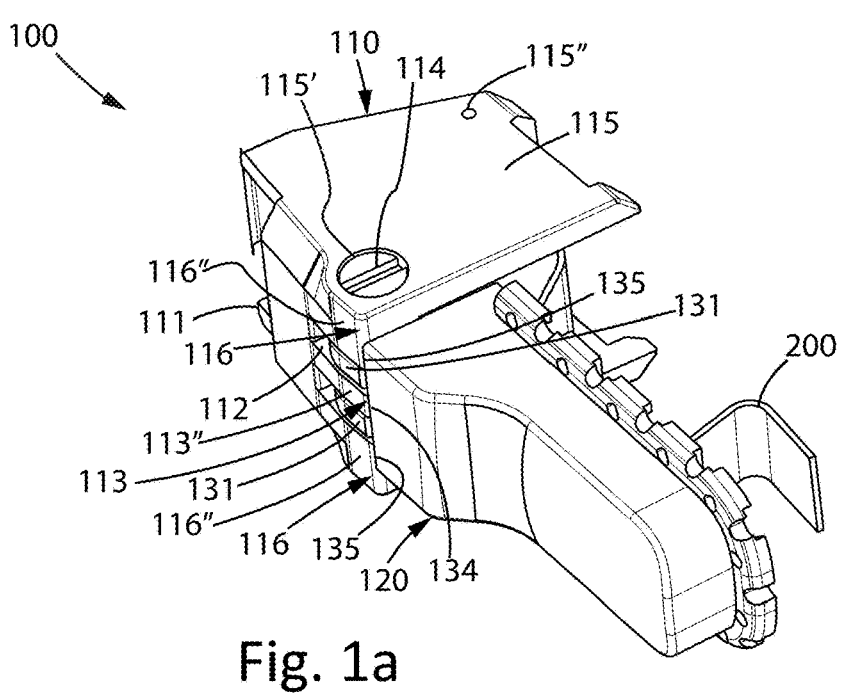
FIG. 1a is a prospective view of a hinge assembly according to a first embodiment of the present disclosure when it is in a first stable opening position.
Figure 1B:
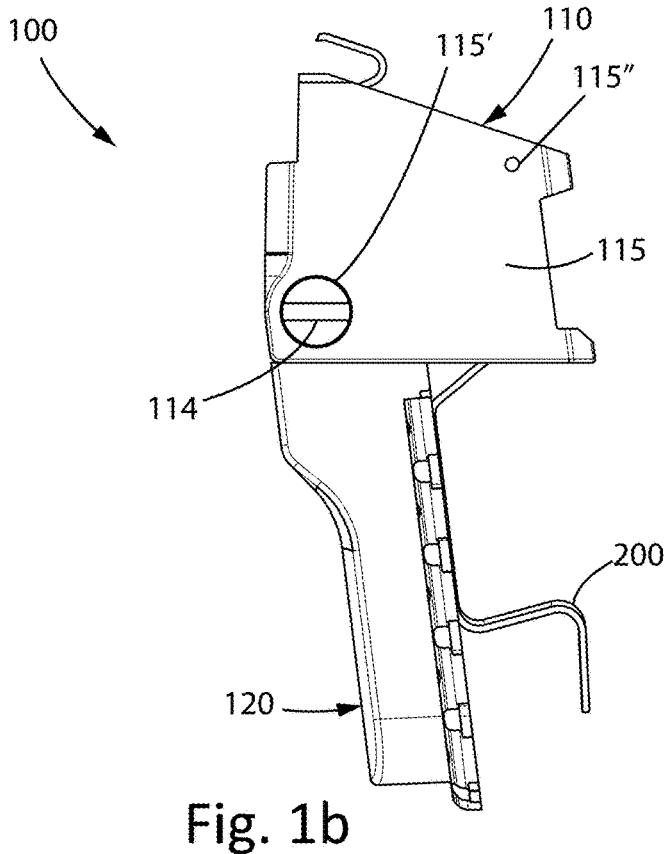
Figure 1C:
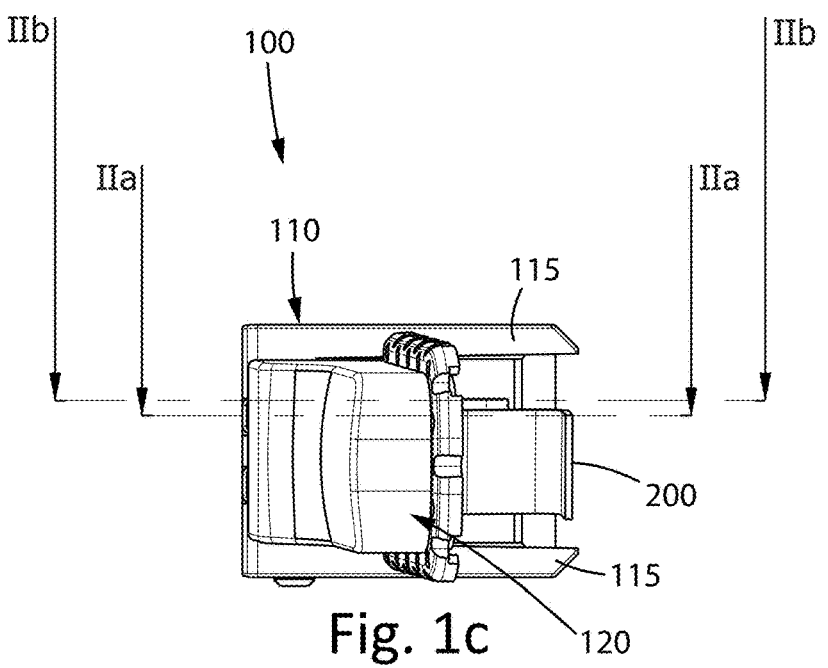
FIG. 1c is a front view of the hinge assembly of FIGS. 1a and 1b.
Figure 2A:
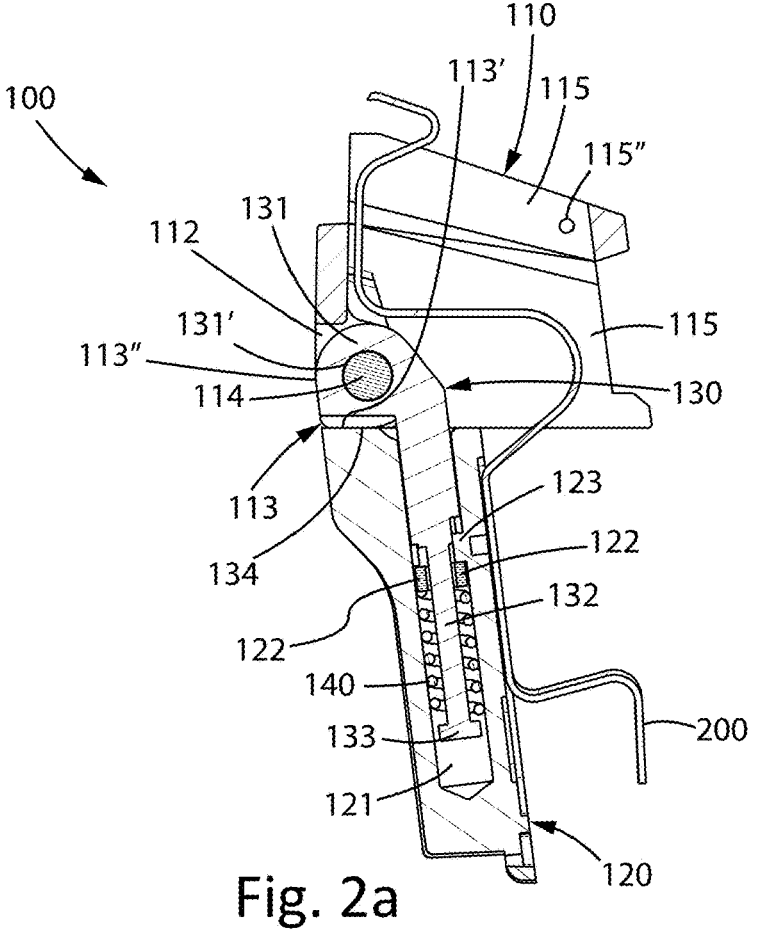
FIGS. 2a, 2b are two sectional views respectively along the lines IIa-IIa, IIb-IIb of the hinge assembly of FIG. 1c.
Figure 2B:
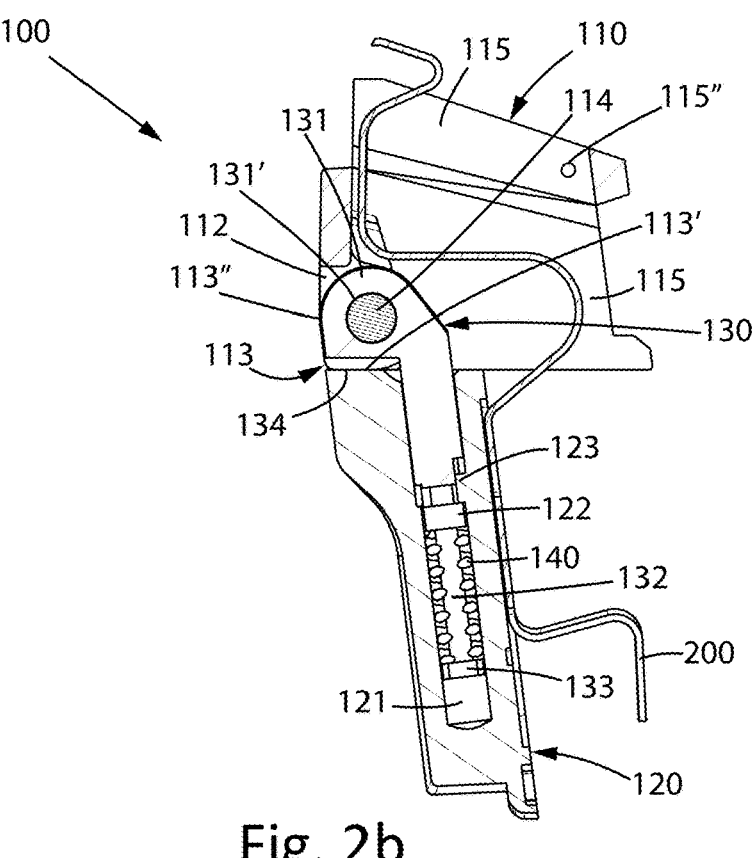
Figure 3A:
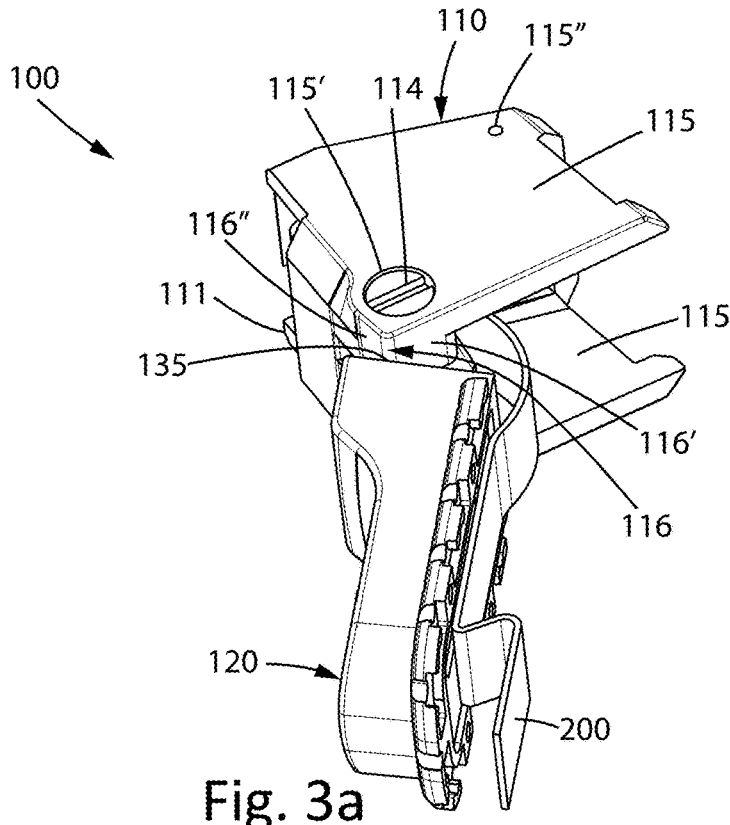
FIG. 3a is a prospective view of a hinge assembly according to the first embodiment of the present disclosure when it is in an intermediate position between the first stable opening position and a second stable closing position.
Figure 3B:
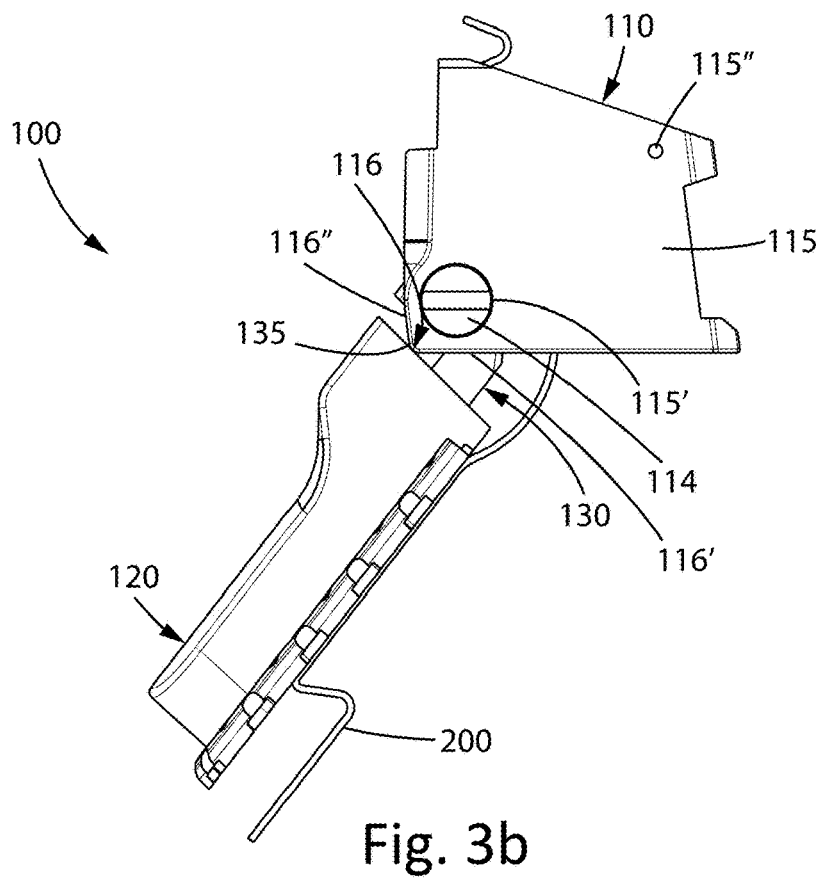
Figure 3C:
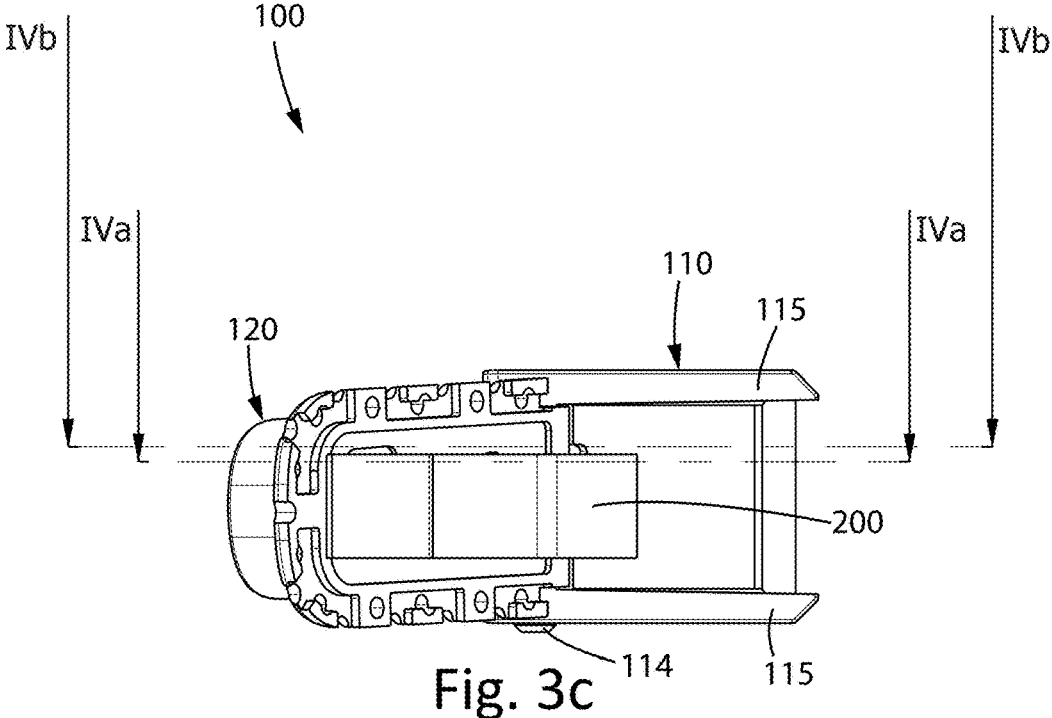
FIG. 3c is a front view of the hinge assembly of FIGS. 3a and 3b.
Figures 4A, 4B:
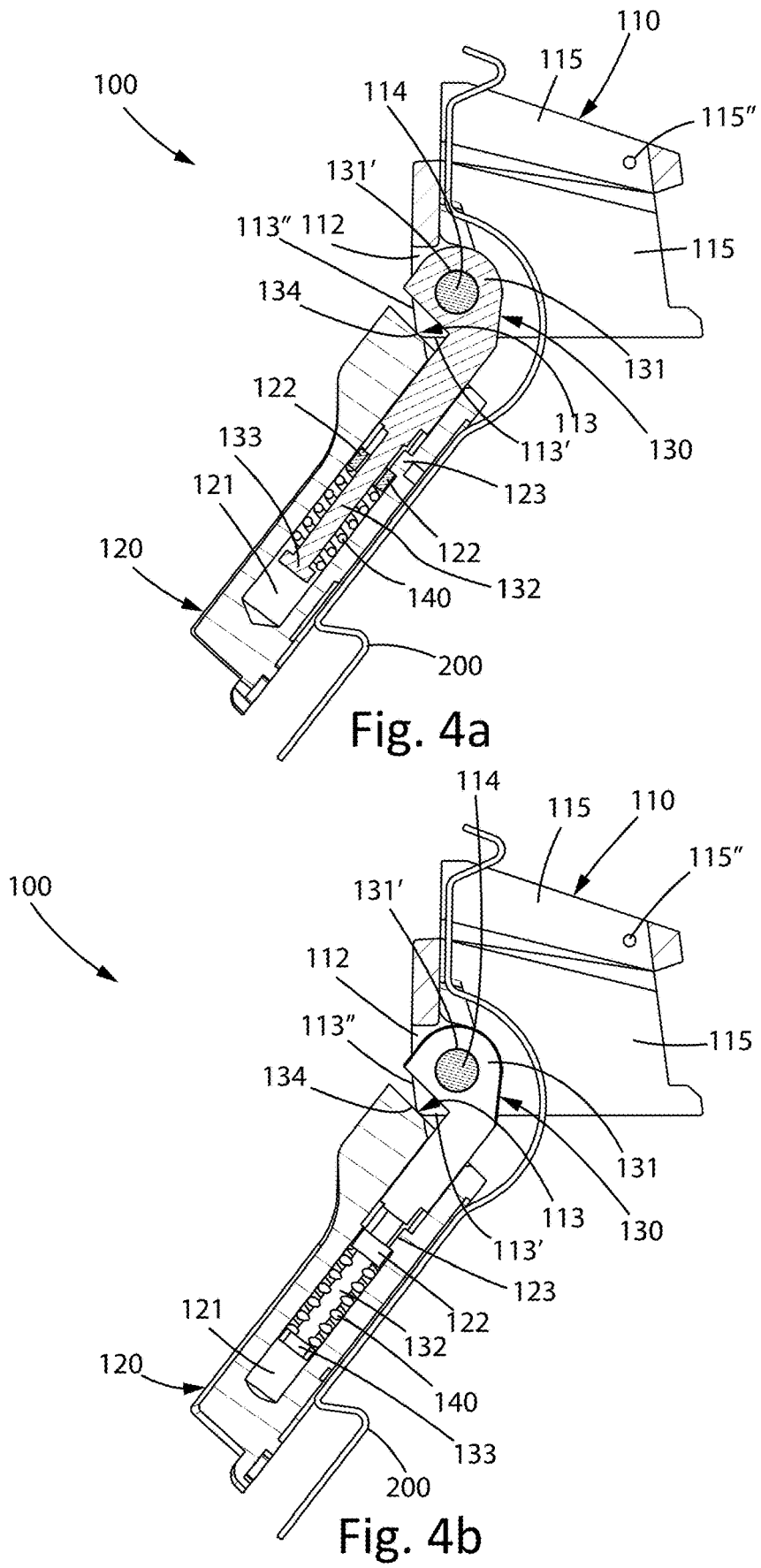
FIGS. 4a, 4b are two sectional views respectively along the lines IVa-IVa, IVb-IVb of the hinge assembly of FIG. 3c.
Figure 5A:
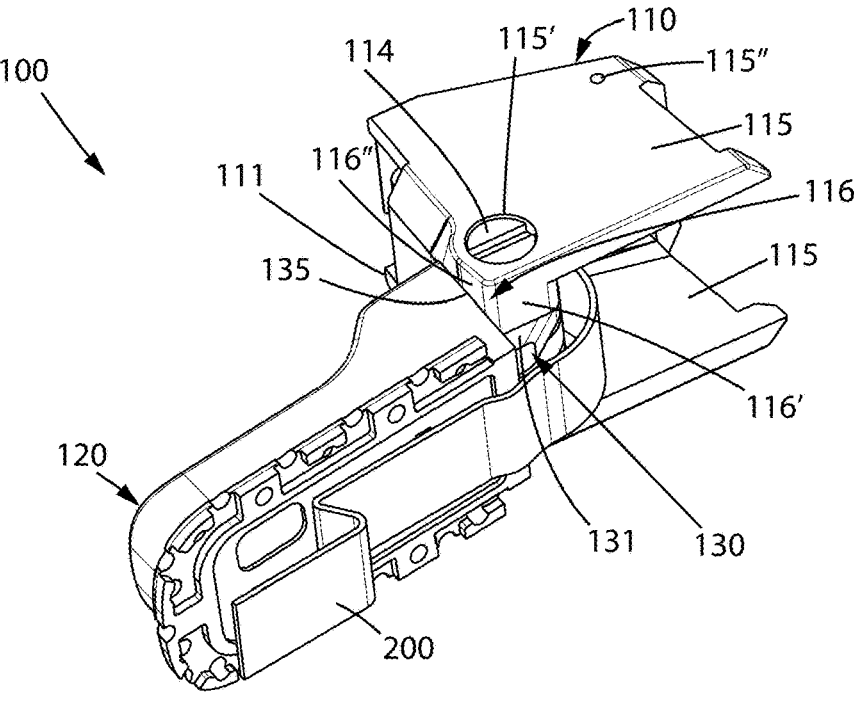
FIG. 5a is a prospective view of a hinge assembly according to the first embodiment of the present disclosure when it is in the second stable closing position.
Figure 5B:
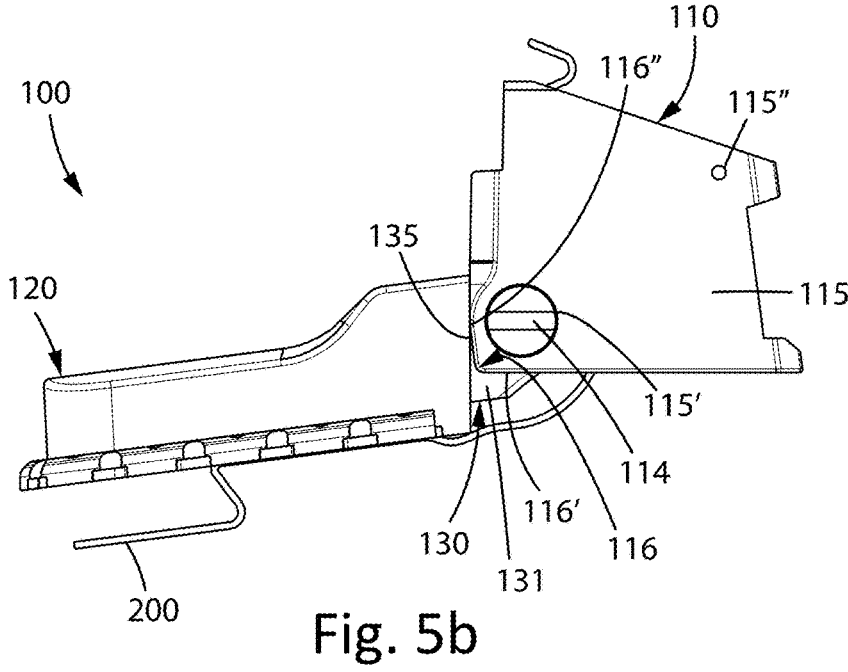
Figure 5C:
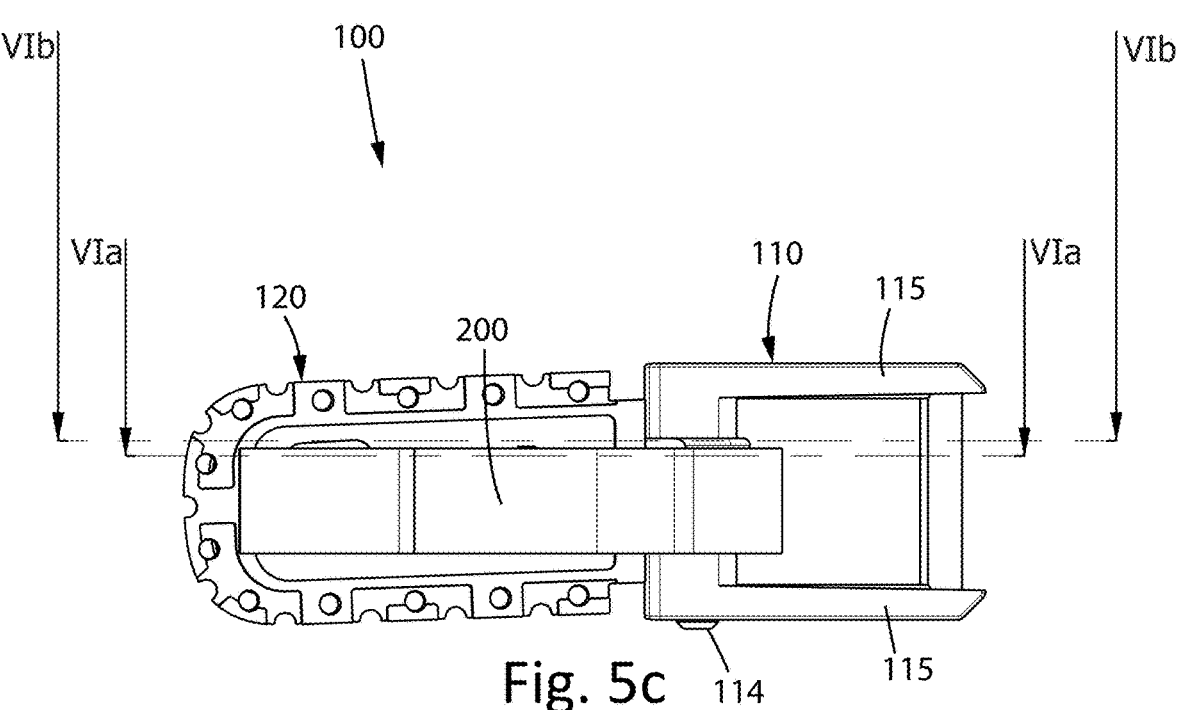
FIG. 5c is a front view of the hinge assembly of FIGS. 5a and 5b.
Figure 6A:
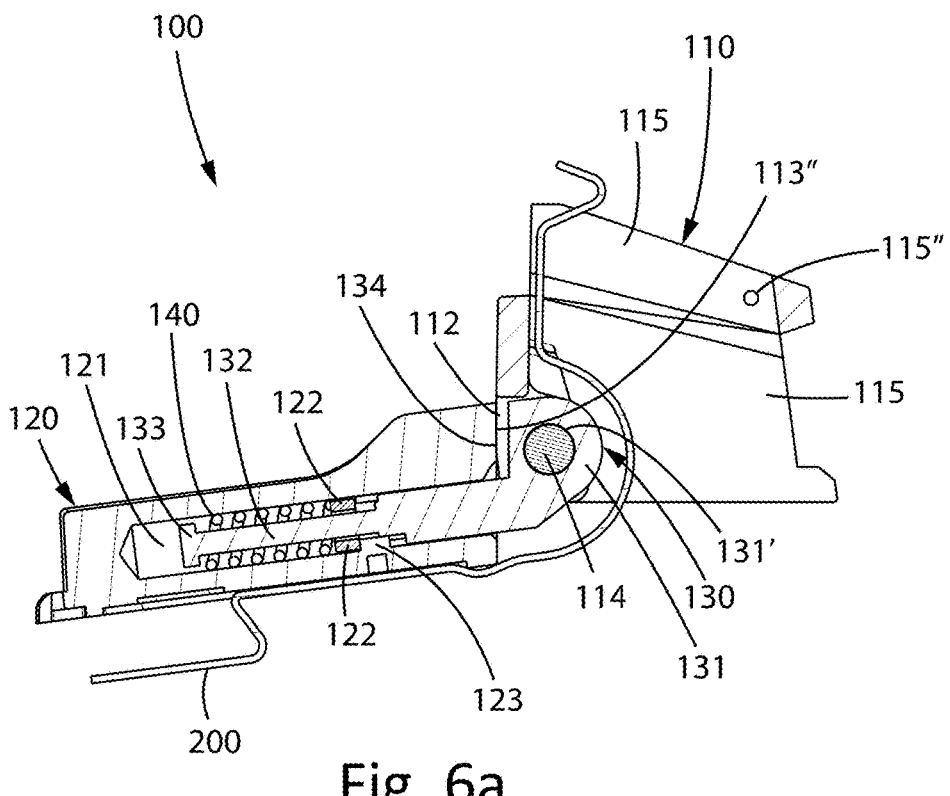
FIGS. 6a, 6b are two sectional views respectively along the lines VIa-VIa, VIb-VIb of the hinge assembly of FIG. 5c.
Figure 6B:
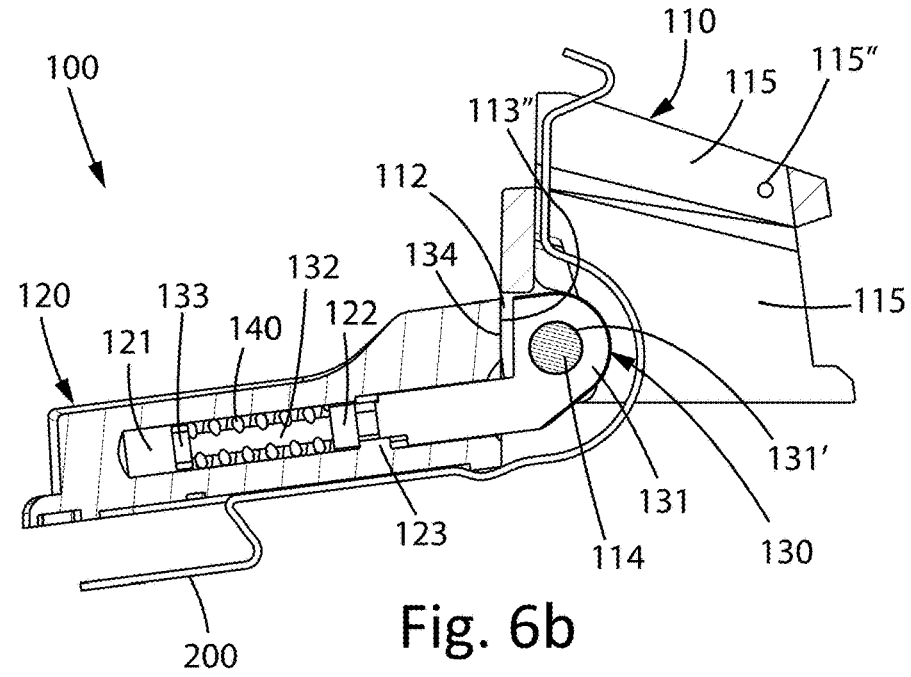
Figure 7A:
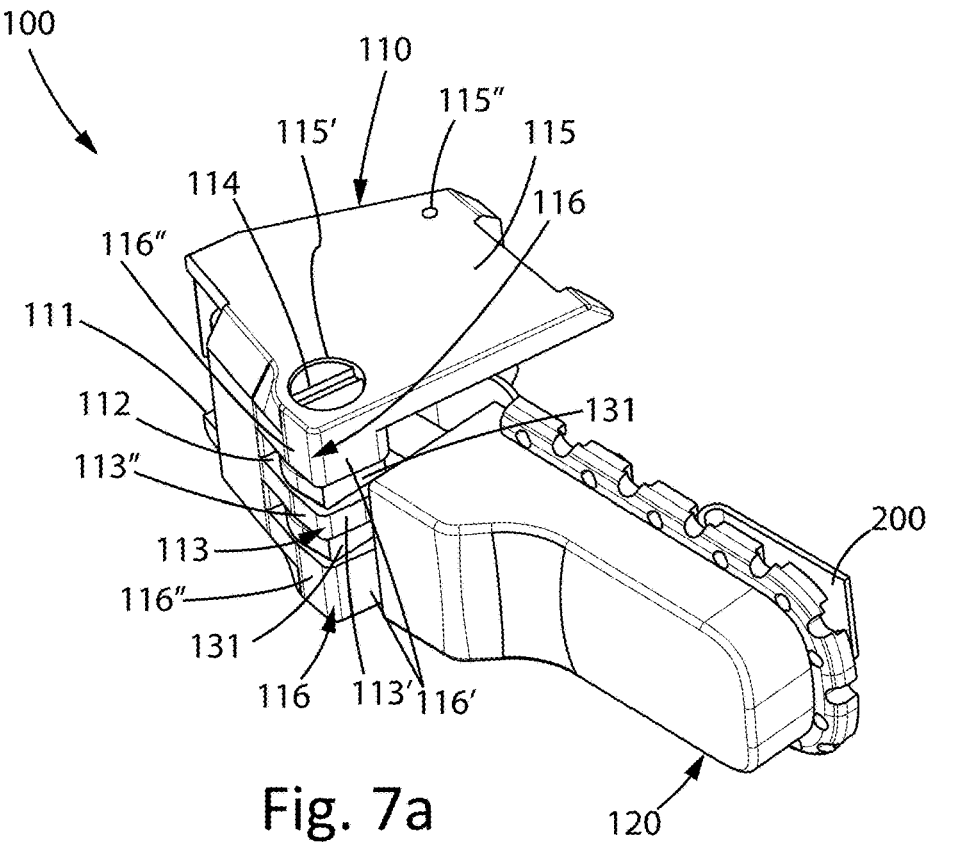
FIG. 7a is a prospective view of a hinge assembly according to the first embodiment of the present disclosure when it is in a third unstable overtravel position.
Figure 7B:
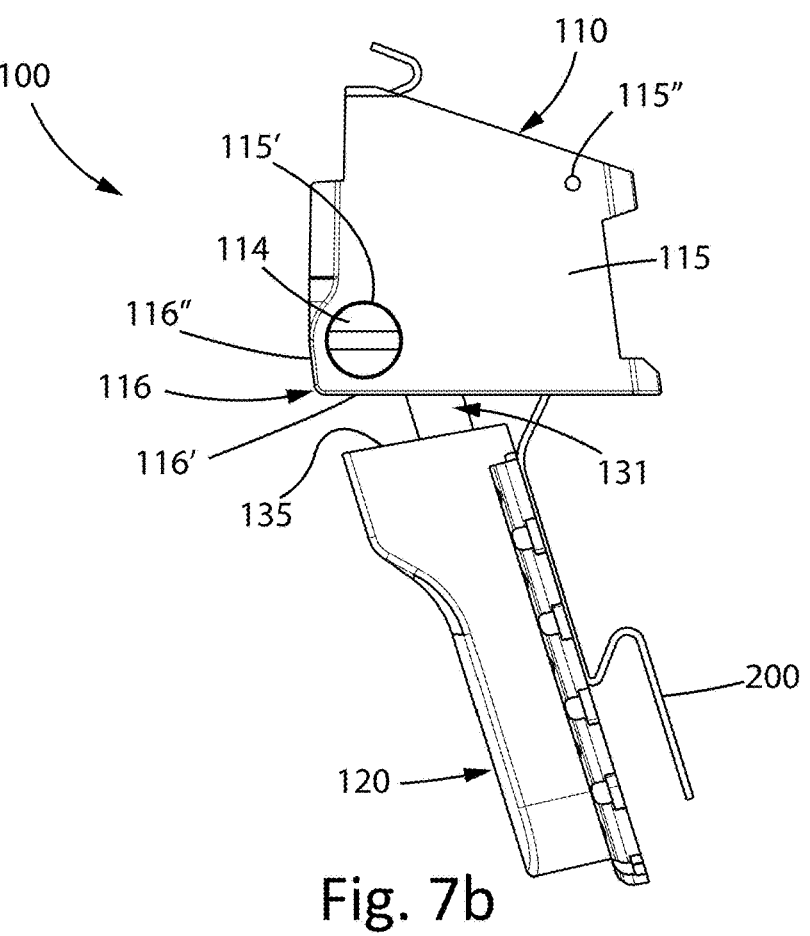
Figure 7C:
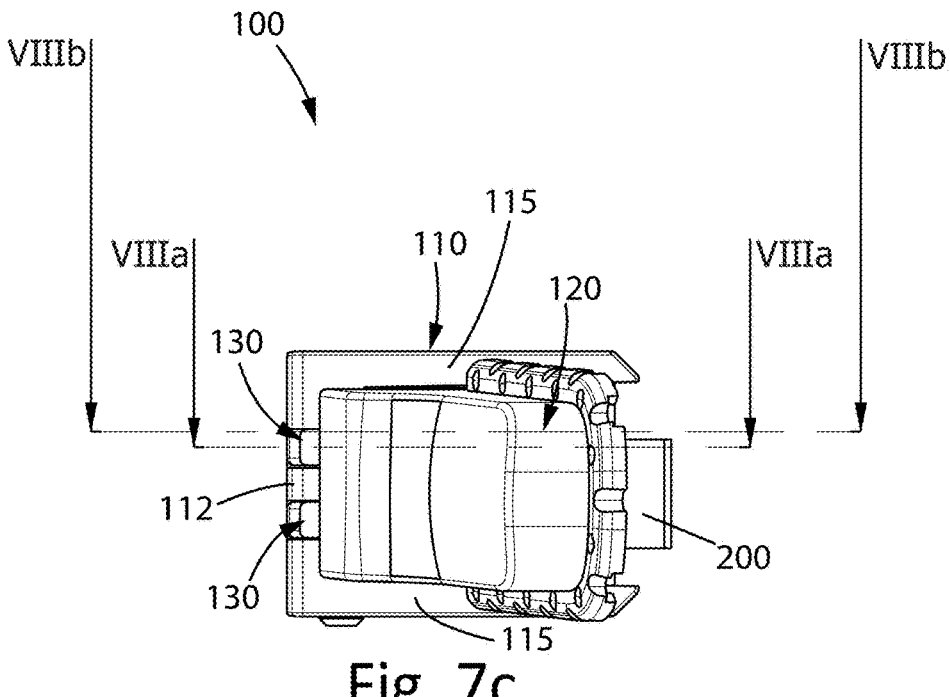
FIG. 7c is a front view of the hinge assembly of FIGS. 7a and 7b.
Figures 8A, 8B:
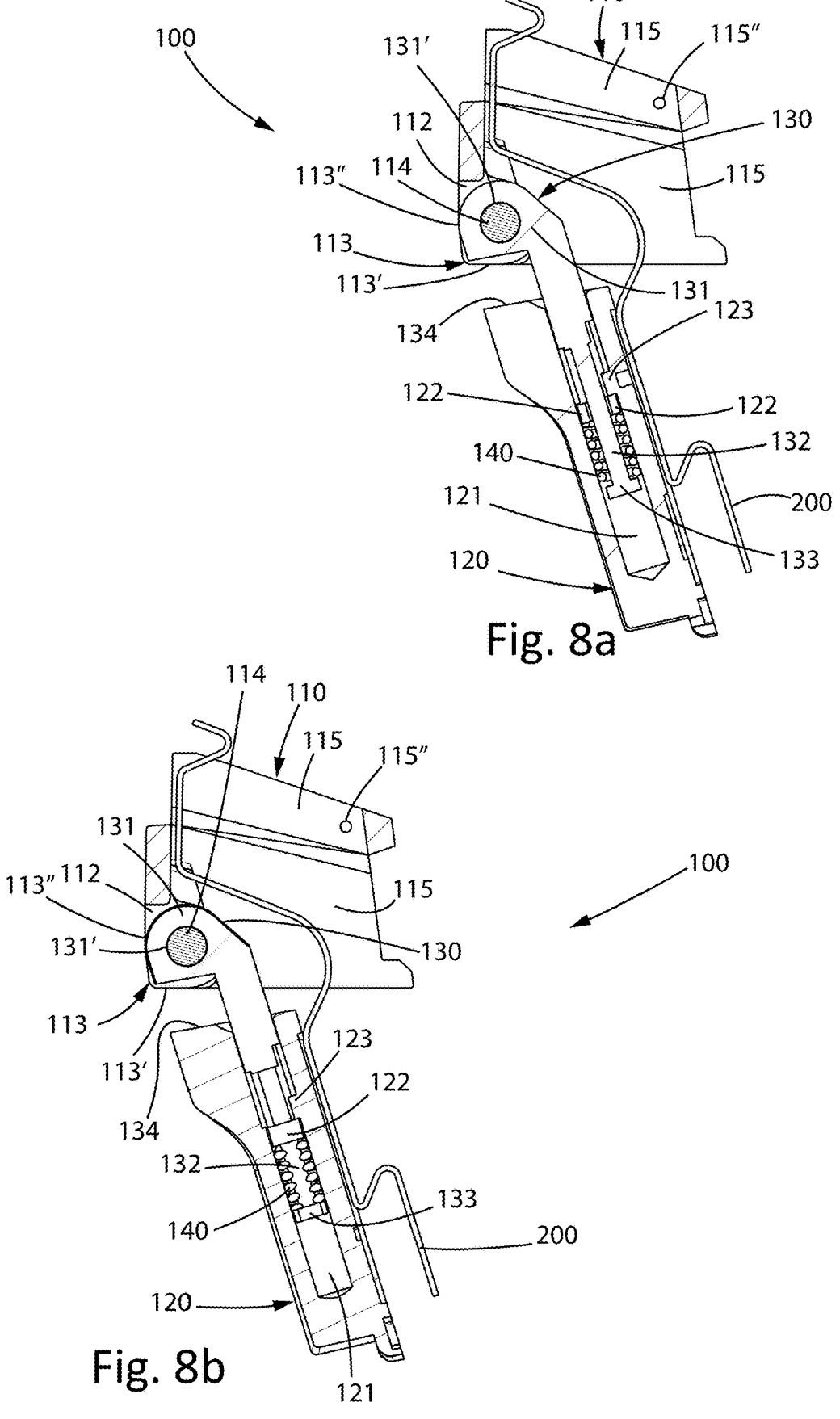
FIGS. 8a, 8b are two sectional view respectively along the lines VIIIa-VIIIa, VIIIb-VIIIb of the hinge assembly of FIG. 7c.
Figure 9:
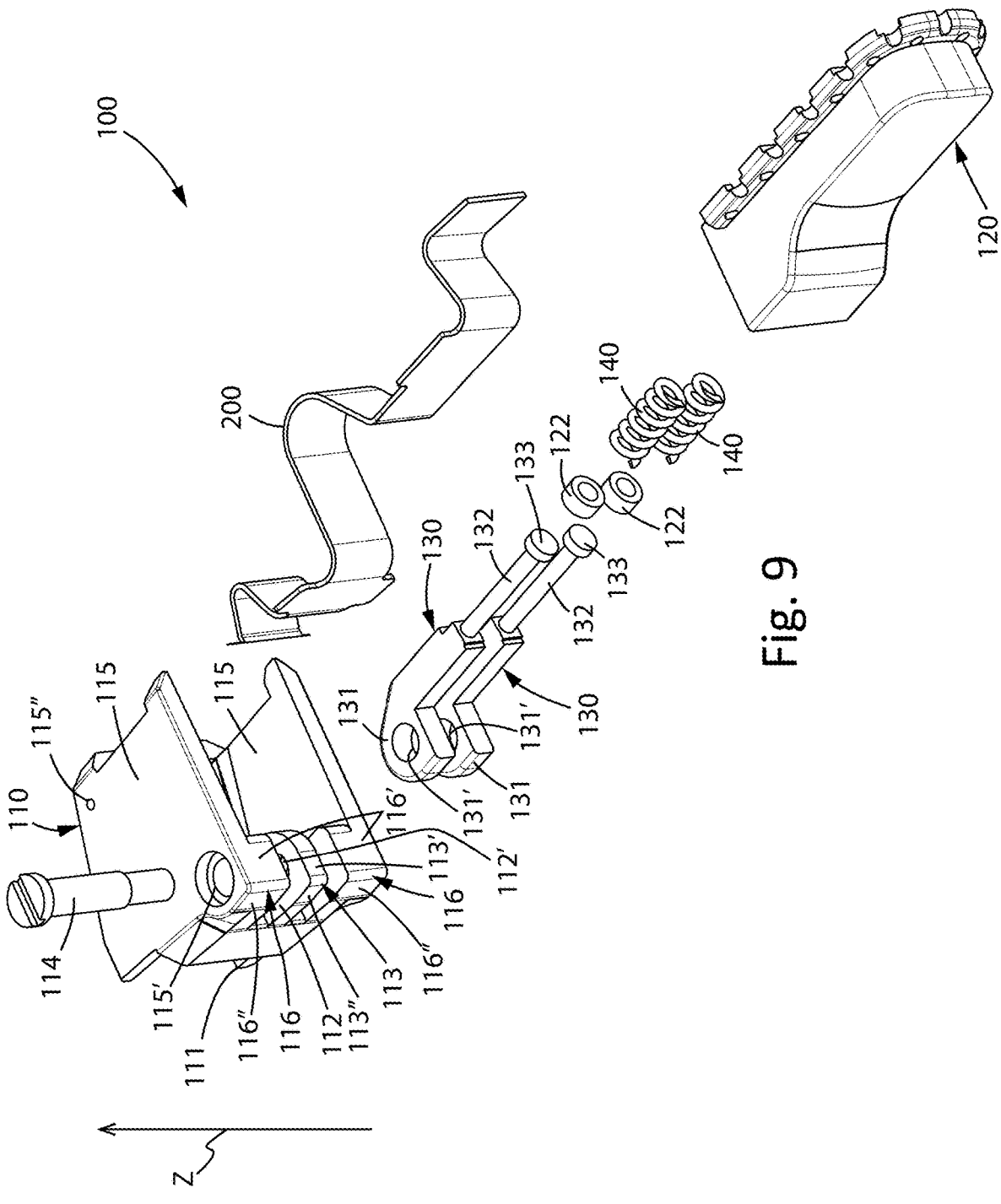
FIG. 9 is a prospective exploded view of a hinge assembly according to the first embodiment of the present disclosure.
Figure 10:
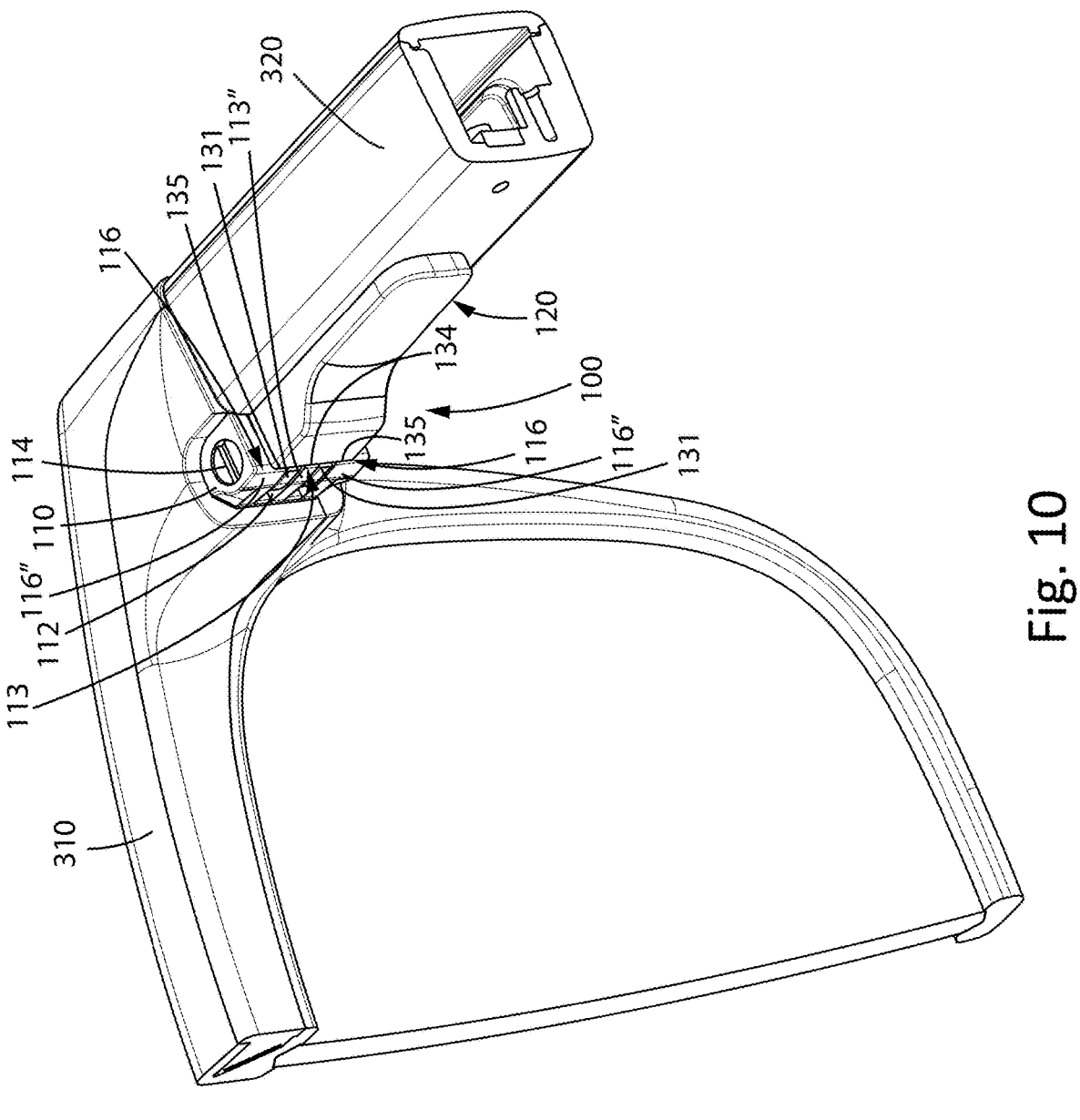
FIG. 10 is a partial prospective view of eyewear according to the present disclosure.
Figure 17:
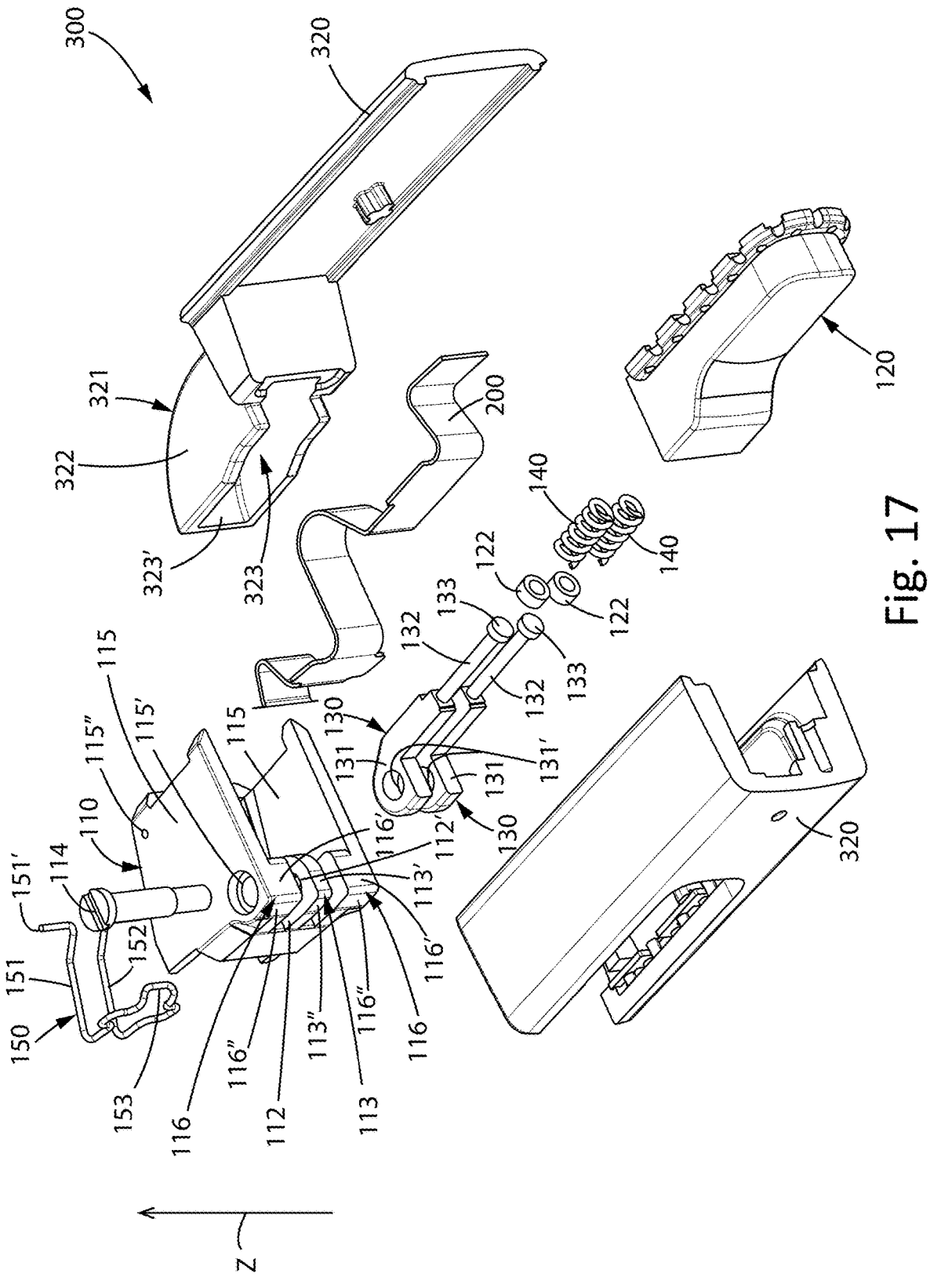
FIG. 17 is a partial prospective exploded view of the eyewear of FIG. 15.
Figure 18:
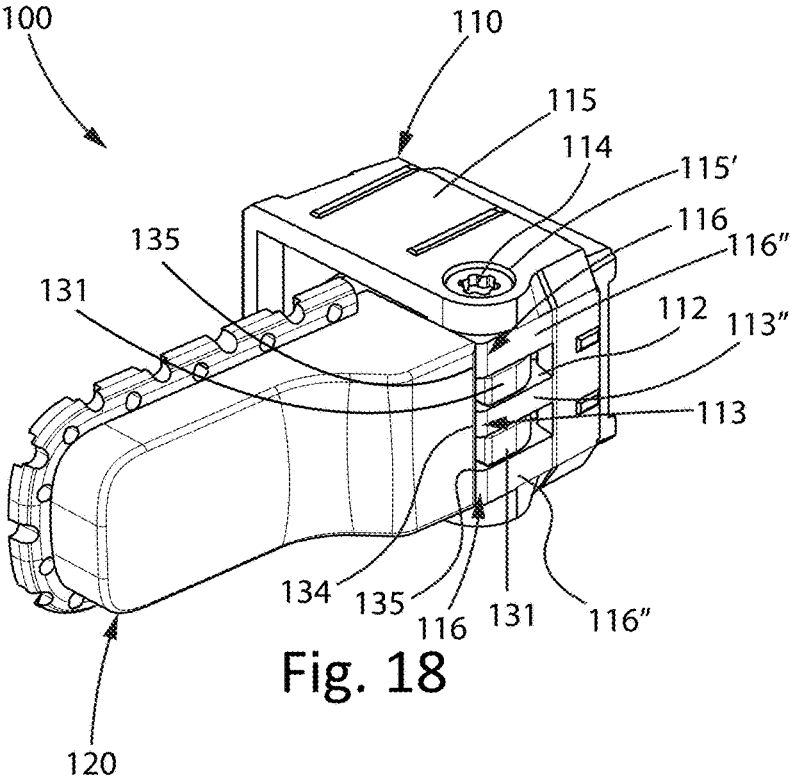
FIG. 18 is a prospective view of a hinge assembly according to a fifth embodiment of the present disclosure when it is in a first stable opening position.
Figure 19:
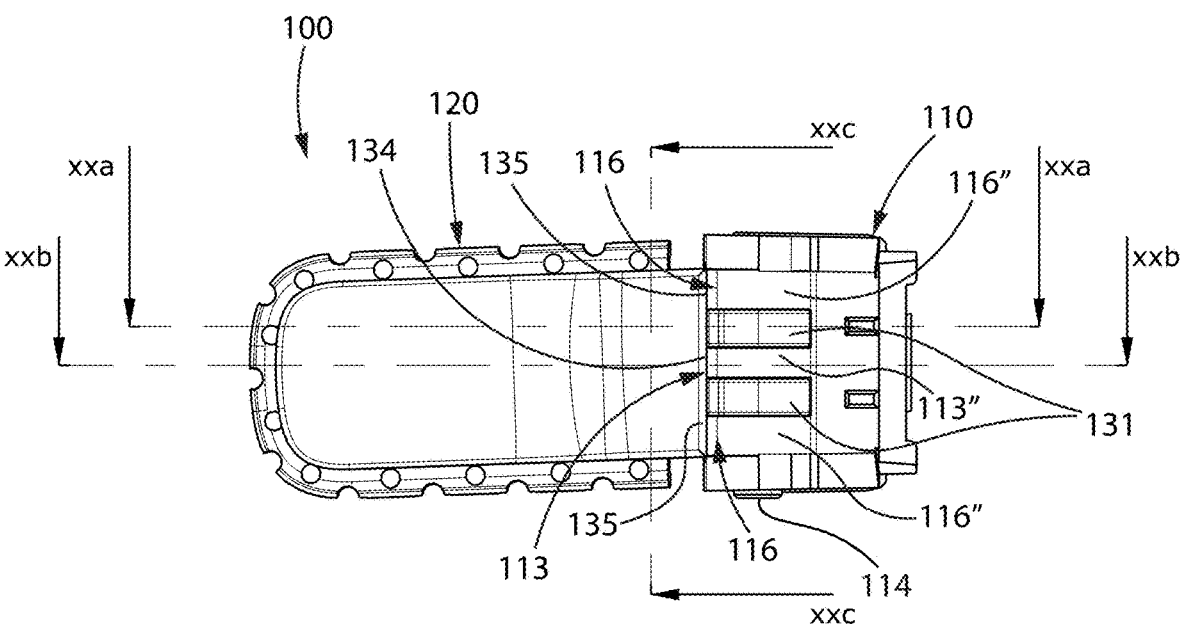
FIG. 19 is a lateral view of the hinge assembly of FIG. 18.
Figure 21:
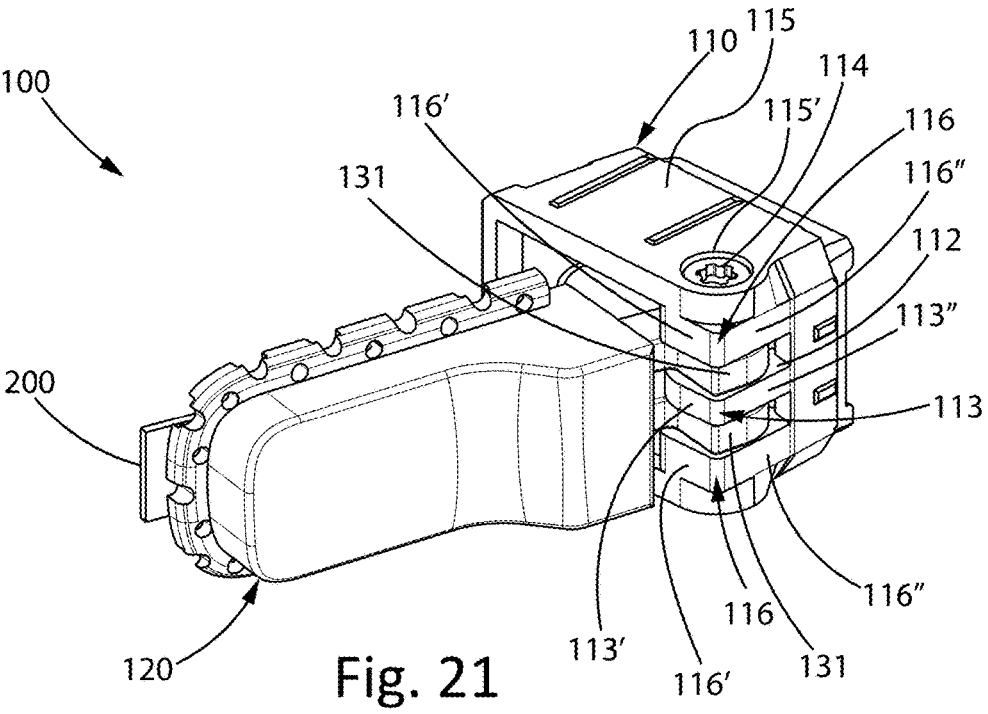
FIG. 21 is a prospective view of a hinge assembly according to the fifth embodiment of the present disclosure when it is in a third unstable overtravel position.
Figure 22:
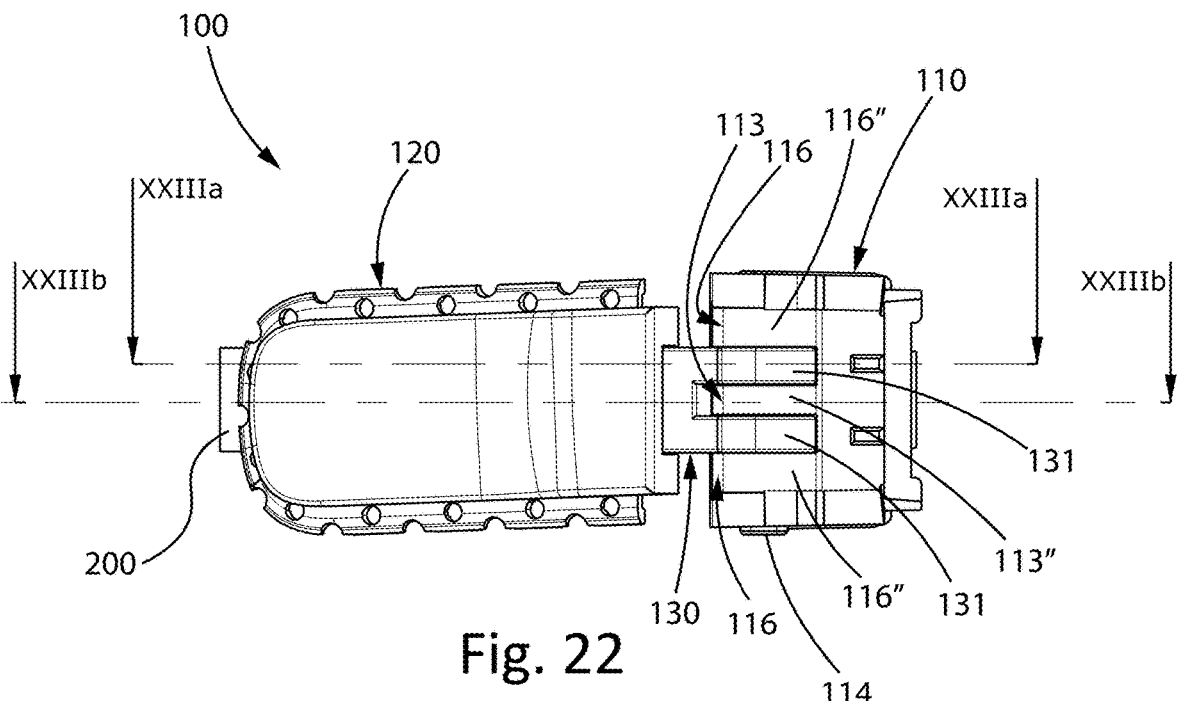
FIG. 22 is a lateral view of the hinge assembly of FIG. 21.
Figure 23A:
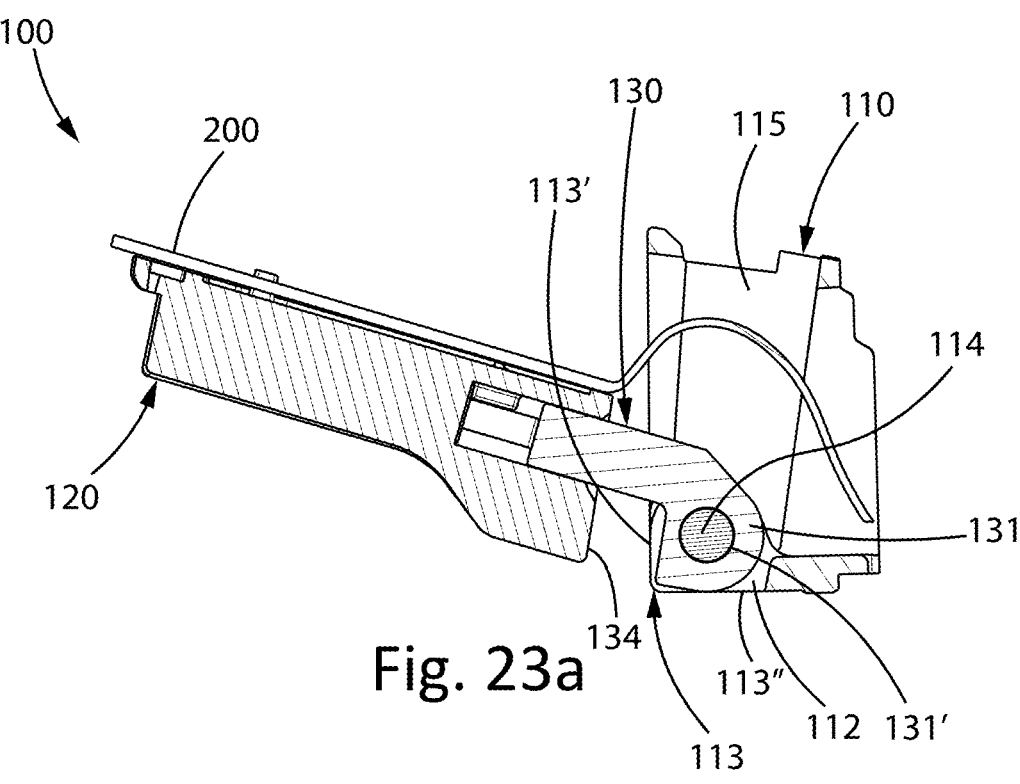
FIGS. 23a, 23b are two sectional views respectively along the lines XXIIIa-XXIIIa, XXIIIb-XXIIIb of the hinge assembly of FIG. 22.
Figure 23B:
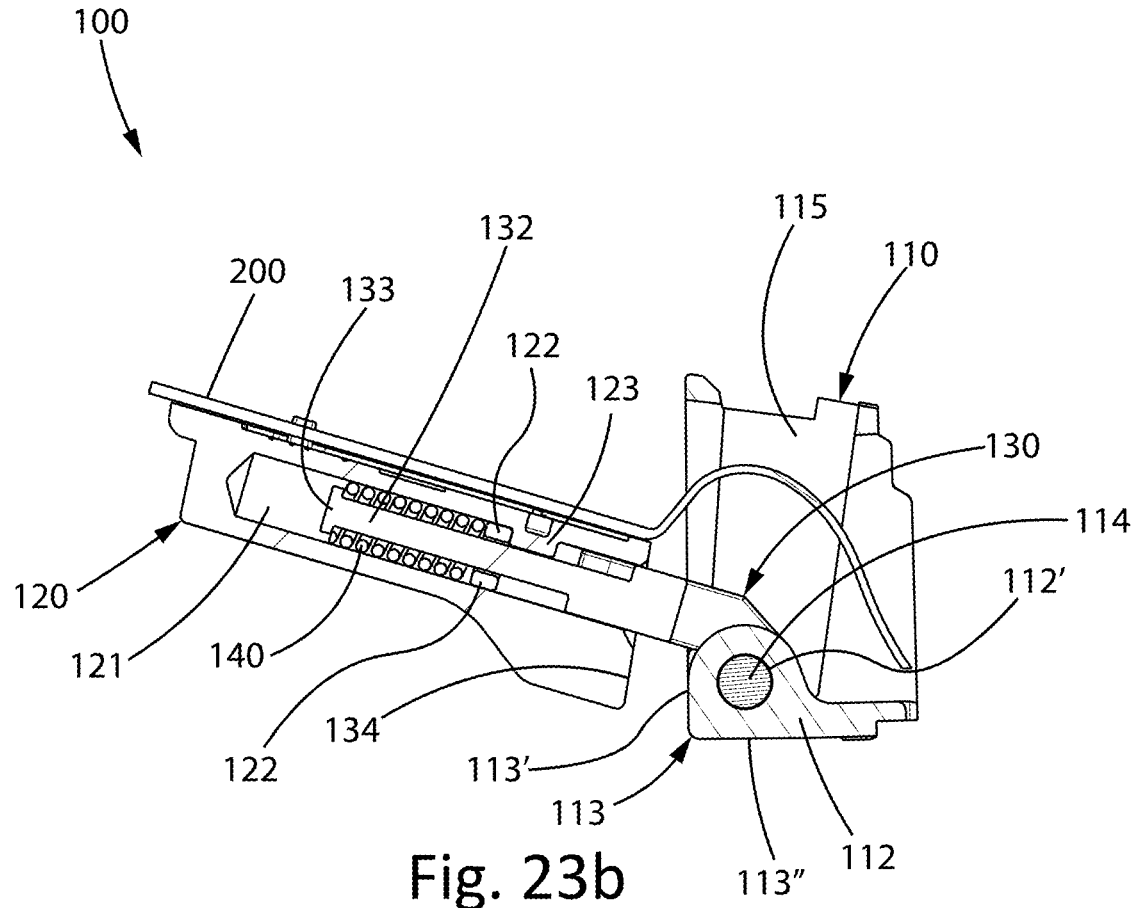
Figure 24:
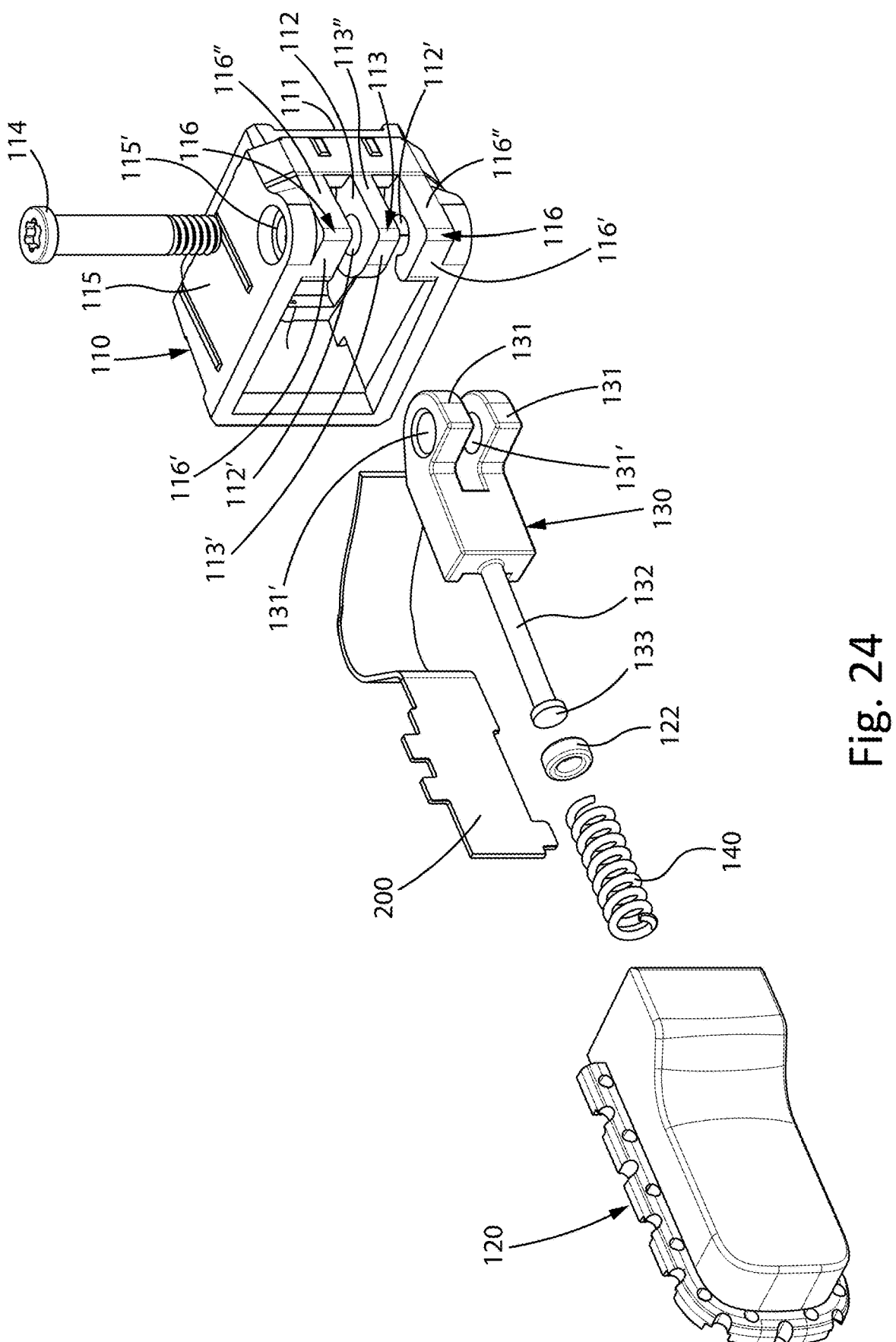
FIG. 24 is a prospective exploded view of a hinge assembly according to the fifth embodiment of the present disclosure.

For the sake of simplicity, in the present description reference will be made to a vertical axis Z and to an orientation of the hinge assembly 100 as shown in FIGS. 9 and 17.

Advantageously, the hinge assembly 100 can be mounted in a pair of eyewear 300.

The eyewear 300 comprises a front 310, adapted to carry at least one lens, and two temples 320. In particular, the temples 312 are adapted to allow a user to wear the eyewear 300. The eyewear 300 comprises two hinge assemblies 100, each of which couples a respective temple 320 to the front 310.

Preferably, the eyewear 300 is of the smart eyewear type. In this case, the eyewear 300 comprises flexible cable 200 adapted to electrically connect to each other electric or electronic devices integrated in the front 310 and in the temples 320, respectively.

In the case in which the eyewear 300 is not of the smart eyewear type, the flexible cable 200 is not present but, for the sake of simplicity and non limiting purposes, the flexible cable 200 is illustrated in all the attached figures.

The hinge assembly 100 comprises an anchor element 110 configured to be applied to the front 310 of the eyewear 300.

The hinge assembly 100 comprises an anchor box 120 configured to be applied to the temple 320 of the eyewear 300.

The anchor box 120 comprises at least one housing chamber 121 opened towards the outside and facing the anchor element 110.

The at least one housing chamber 121 has an inner retaining member 122.

More details about the inner retaining member 122 will be shown in the following of the present description. The hinge assembly 100 comprises at least one hinging member 130 having at least one end portion 131 rotatably coupled to the anchor element 110 and at least one shaft-like shaped portion 132 extending towards the opposite side with respect to the at least one end portion 131.

The at least one shaft-like shaped portion 132 ends with at least one head portion 133 at least partially housed in at least one respective housing chamber 121. The hinge assembly 100 comprises at least one elastic element 140 passed through by at least one respective shaft-like shaped portion 132 and, from one side, in contact with the inner retaining member 122 and, from the other side, in contact with the at least one head portion 133.

The at least one elastic element 140 is preloaded in compression.

Moreover, the at least one elastic element 140 is housed in at least one respective housing chamber 121. The hinge assembly 100 can reversibly pass from a first stable opening position to a second stable closing position and vice versa and from the first stable opening position to a third unstable overtravel position and vice versa In particular, the hinge assembly 100 can pass from the first stable opening position to the second stable closing position and vice versa by means of the rotation, in contrast with the at least one elastic element 140, of the anchor box 120 and the at least one hinging member 130 with respect to the anchor element 110 about a first hinging axis, and from the first stable opening position to the third unstable overtravel position by means of the rotation, in contrast with the at least one elastic element 140, of the at least one hinging member 130 with respect to the anchor element 110 about the first hinging axis and the anchor box 120 with respect to the anchor element 110 about a second hinging axis parallel to said first hinging axis.

More details about the first hinging axis and the second hinging axis will be shown in the following of the present description.

The first stable opening position corresponds to the position in which the temples 320 of the eyewear 300 are opened and the eyewear 300 can be worn by the user. The second stable closing position corresponds to the position in which the temples 320 of the eyewear 300 are closed and the eyewear 300 cannot be worn by the user.

The third unstable overtravel position corresponds to the position in which the temples 320 of the eyewear are opened beyond the first stable opening position. Preferably, according for example to a first embodiment shown in the attached figures, the anchor element 110 comprises a coupling portion 111 and at least one cantilevered portion 112 extending towards the opposite side with respect to the coupling portion 111.

In particular, the coupling portion 111 is configured to be applied to the front 310.

The at least one end portion 131 is rotatably coupled to the at least one cantilevered portion 112.

The at least one cantilevered portion 112 comprises at least one first cam 113 and the anchor box 120 comprises at least one first guiding end 134 that faces the at least one cantilevered portion 112 and that is configured to slide on the at least one first cam 113 when the hinge assembly 100 passes from the first stable opening position to the second stable closing position or vice versa.

In more details, the at least one first cam 113 is made on the boundary of the at least one cantilevered portion 112.

The at least one first guiding end 134 is a free end of a wall of the anchor box 120 that faces the at least one cantilevered portion 112.

The at least one first cam 113 is shaped so that during the passage between the first stable opening position to the second stable closing position and vice versa, the interaction between the at least one first guiding end 134 and the at least one first cam 113 causes that the at least one head portion 133 and the inner retaining member 122 in a first phase approach to each other compressing the at least one elastic element 140 and, in a subsequent second phase, move away from each other relaxing the at least one elastic element 140.

During the passage from the first stable opening position to the third unstable overtravel position the at least one first guiding end 134 moves away from the at least one first cam 113 and the at least one head portion 133 and the inner retaining member 122 approach to each other compressing the at least one elastic element 140.

In more details, in the first phase and so during an initial step of the rotation of the at least one hinging member 130 when the hinge assembly 100 passes from the first stable opening position to the second stable closing position or vice versa, and when the hinge assembly 100 passes to the third unstable overtravel position, the at least one elastic element 140 is compressed by the fact that the at least one head portion 133 and the inner retaining member 122 approach relatively. In this case, the at least one head portion 133 and the inner retaining member 122 load in compression the at least one elastic element 140 with an elastic force.

When the hinge assembly 100 passes from the first stable opening position to the second stable closing position or vice versa, the relative approaching between the at least one head portion 133 and the inner retaining member is 122 made thanks to the collaboration between the at least one first guiding end 134 and the at least one first cam 113.

In other words, the elastic force is loaded by the relative approaching of the at least one head portion 133 and the inner retaining member 122.

In the second phase and so during a final step of the rotation of the at least one hinging member 130 when the hinge assembly 100 passes from the first stable opening position to the second stable closing position or vice versa, and when the hinge assembly 100 passes from the third unstable overtravel position to the first stable opening position, the at least one head portion 133 and the inner retaining member 122 move away relatively.

In this case, the at least one elastic element 140 extends as a result of the loaded elastic force. When the hinge assembly 100 passes from the first stable opening position to the second stable closing position or vice versa, the relative moving away between the at least one head portion 133 and the inner retaining member 122 is made thanks to the collaboration between the at least one first guiding end 134 and the at least one first cam 113.

On one hand, when the hinge assembly 100 is in an intermediate position between the first stable opening position and the second stable closing position, if the the anchor box 120 is released (or in the case in which the hinge assembly 100 is mounted in the eyewear 300, if the temple 320 released), the loaded elastic force extends the at least one elastic element 140 which in turn moves away the at least one head portion 133 and the inner retaining member 122 relatively, thus causing the rotation of the anchor box 120 and the at least one hinging member 130 about the first hinging axis.

In this way, the hinge assembly 100 (or in the case in which the hinge assembly 100 is mounted in the eyewear 300, the temple 320), returns to the first stable opening position or to the second stable closing position.

On the other hand, when the hinge assembly 100 is in an intermediate position between the first stable opening position and the third unstable overtravel position, or when the the hinge assembly 100 is in the third unstable overtravel position, if the anchor box 120 is released (or in the case in which the hinge assembly 100 is mounted in the eyewear 300, if the temple 320 is released) the loaded elastic force extends the at least one elastic element 140 which in turn moves away the at least one head portion 133 and the inner retaining member 122 relatively, thus causing the rotation of the anchor box 120 about the second hinging axis and of the at least one hinging member 130 about the first hinging axis.

In this way, the hinge assembly 100 (or in the case in which the hinge assembly 100 is mounted in the eyewear 300, the temple 320) returns to the stable opening position.

Preferably, as for example in the first embodiment, the inner walls of at least one respective housing chamber 121 comprise a step-like shaped portion 123 and the inner retaining member 122 is a bush 122 that is passed through by the at least one shaft-like shaped portion 132 and in abutment on the step-like shaped portion 123.

In this case, the at least one elastic element 140 is in contact with the bush 122.

In an alternative embodiment not illustrated in the figures, the retaining member 122 is formed by a spring clip passed through by the at least one shaft-like shaped portion 132 and coupled to the the inner walls of at least one respective housing chamber 121.

In another alternative embodiment, the retaining member 122 is a protrusion of the inner walls of at least one respective housing chamber 121. Such a protrusion, for example, is made by welding.

During the passage of the hinge assembly 100 between the first stable opening position and the second stable closing position, and between the first stable opening position and the third unstable overtravel position, the bush 122 remains in abutment on the step-like shaped portion 123 thanks to the preloaded elastic force of the at least one elastic element 140 that keeps the bush 122 pushed against the step-like shaped portion 123.

Preferably, the at least one first cam 113 comprises a first endstroke abutment surface 113' and a second endstroke abutment surface 113".

In this case, the at least one first guiding end 134 and the first endstroke abutment surface 113" are configured to identify the first stable opening position when they are in abutment one on the other, the at least one first guiding end 134 and the second endstroke abutment surface 113" are configured to identify the second stable closing position when they are in abutment one on the other.

In more details, when the hinge assembly 100 passes from the first stable opening position to the second stable closing position, the at least one first guiding end 134 is configured to slide on the at least one first cam 113 from the first endstroke abutment surface 113' to the second endstroke abutment surface 113".

On the other hand, when the hinge assembly 100 passes from the second stable closing position to the first stable opening position the at least one first guiding end 134 is configured to slide on the at least one first cam 113 from the second endstroke abutment surface 113" to the first endstroke abutment surface 113'.

Preferably, the at least one cantilevered portion 112 has a first through hole 112'. In this case, the at least one end portion 131 has a second through hole 131' arranged at the first through hole 112'. Moreover, the hinge assembly 100 comprises a pin 114 housed in the first through hole 112' and in the second through hole 131'.

In this case, the first hinging axis is defined by the pin 114.

In other words, the first hinging axis passes through the first through hole 112' and the second through hole 131'.

Preferably, the anchor box 120 is configured to push on a point of the anchor element 110 when the hinge assembly 100 passes from the first stable opening position to the third unstable overtravel position.

In this case the second hinging axis passes through said point.

Therefore, when the hinge assembly 100 passes from the first stable opening position to the third unstable overtravel position and vice versa, the anchor box 120 rotates with respect to the anchor element 110 about the second hinging axis while the at least one hinging member 130 rotates with respect to the anchor element 110 about the first hinging axis.

Preferably, the first hinging axis is substantially parallel to the second hinging axis.

Preferably, the first hinging axis and the second hinging axis are substantially parallel with respect to the vertical axis Z.

Preferably, the anchor element 110 comprises two boundary walls 115 substantially parallel to the at least one cantilevered portion 112. The at least one end portion 131 is rotatably coupled also to the boundary walls 115.

Preferably, as shown in the attached figures, each boundary wall 115 has a third through hole 115' aligned with respect to the first through hole 112'. In this case, the second through hole 131' of the at least one end portion 131 is aligned also with the third through holes 115', so that the pin 114 passes through the first through hole 112', the second through hole 131' and the third through holes 115'.

Preferably, the boundary walls 115 are parallel to each other and aligned with respect to the vertical axis Z. Preferably, as shown in the attached figures, each one of the boundary walls 115 comprises a respective second cam 116, and the anchor box 120 comprises two second guiding ends 135 each one of which faces a respective second cam 116. In this case, the respective second cam 116 is shaped as the at least one first cam 113.

Preferably, the respective second cam 116 is parallel to the at least one first cam 113.

Preferably, the at least one first cam 113 and the second cams 116 are aligned with each other with respect to the vertical axis Z.

Therefore, when the anchor box 120 and the respective hinging member 130 rotate with respect to the anchor element 110 during the passage of the hinge assembly 100 between the first stable opening position and the second stable closing position, the respective second cam 116 collaborates with the respective second guiding end 135 as the at least one first cam 113 collaborates with the at least one first guiding end 134.

Preferably, each second cam 116 can have a third endstroke abutment surface 116' as the first endstroke abutment surface 113' and a fourth endstroke abutment surface 116" as the second endstroke abutment surface 113". In this case, the respective second guiding end 135 and the respective third endstroke abutment surface 116' of the second cam 116 are configured to identify the first stable opening position when they are in abutment one on the other, the respective second guiding end 135 and the fourth endstroke abutment surface 116" of the second cam 116 are configured to identify the second stable closing position when they are in abutment one on the other.

Preferably, as shown in the attached figures, the housing chambers 121, the hinging members 130 and the elastic elements 140 are in number equal to two respectively.

In this case, the end portions 131, the shaft-like shaped portions 132, the head portions 133, the inner retaining members 122 are in numer equal to two respectively. In particular, each housing chamber 121 has a respective inner retaining member 122.

Preferably, in case the inner retaining members 122 are in numer equal to two, each housing chamber 121 has a respective step-like shaped portion 123.

Preferably, the cantilevered portion 112 and the first cam 113 are in number equal to one respectively. In this case, the first guiding end 134 is in number equal to one.

Preferably, each end portion 131 of the respective hinging member 130 is rotatably coupled to the at least one cantilevered portion 112 and to a respective boundary wall 115.

In more details, each boundary wall 115 identifies a respective free space with the at least one cantilevered portion 112. The end portion 131 of the respective hinging member 130 is housed in the respective free space.

In this case, the pin 114 passes through both second through holes 131' of the respective end portions 131 and each shaft-like shaped portion 132 is housed in a respective housing chamber 121. Moreover, the at least one first guiding end 134 is a free end of the wall between the two housing chambers 121.

Preferably, the two housing chambers 121 are aligned with each other along a direction substantially parallel to the vertical axis Z.

Figure 11:
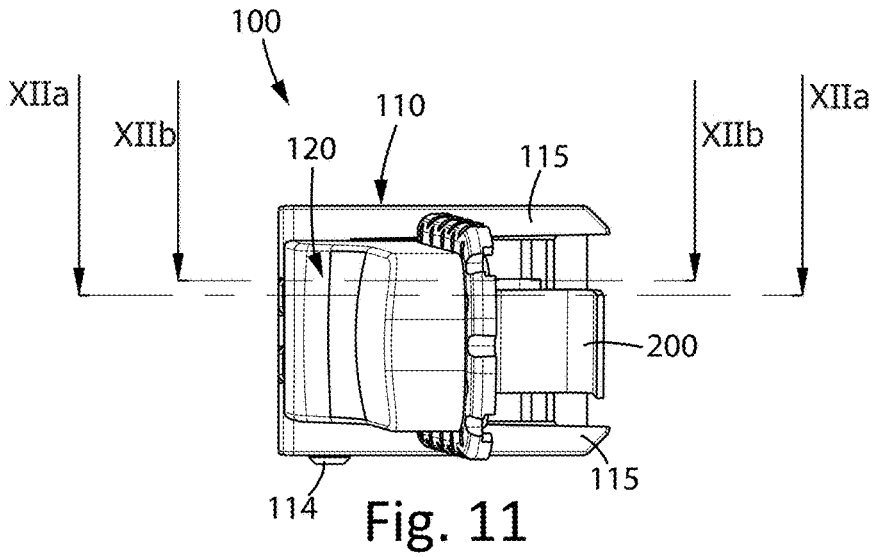
FIG. 11 is a frontal view of a hinge assembly according to a second embodiment of the present disclosure when it is in the first stable opening position.
Figure 12A:
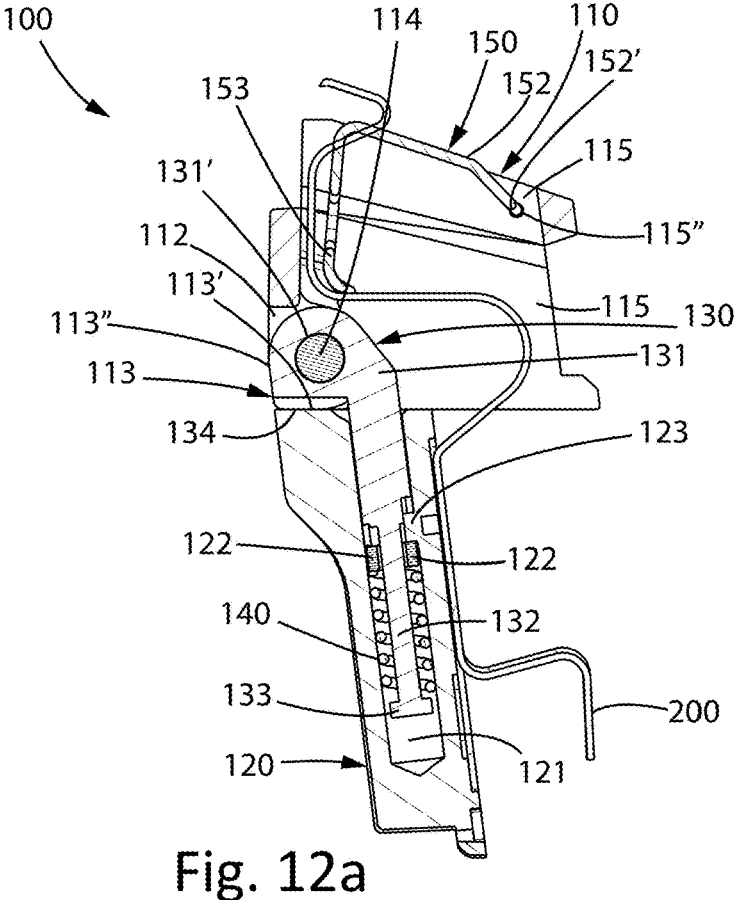
FIG. 12a, 12b are two sectional views respectively along the lines XIIa-XIIa, XIIb-XIIb of the hinge assembly of FIG. 11.
Figure 12B:
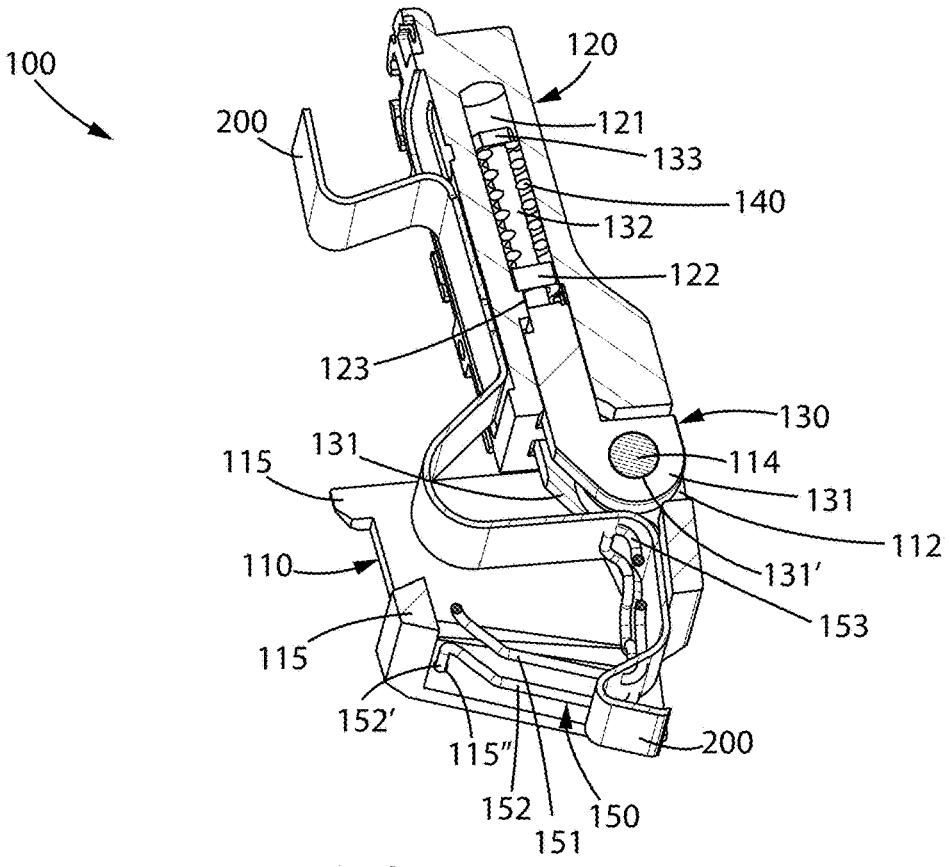

Preferably, according to a second embodiment shown in FIGS. 11-12_b_, the hinge assembly 100 comprises a retaining elastic element 150 housed in and coupled to the anchor element 110.

The retaining elastic element 150 is configured to retain a portion of the flexible cable 200 against the anchor element 110.

Preferably, the retaining elastic element 150 is housed between the boundary walls 115 of the anchor element 110.

In more details, the retaining elastic element 150 is a torsion spring having a first portion 151 coupled to one boundary wall 115, a second portion 152 opposite to the first portion 151 coupled to the other boundary wall 115, and a central portion 153 connecting the first portion 151 and the second portion 152. In particular, the central portion 153 is bridge-shaped. The first portion 151 and the second portion 152 exert a preloaded twisting moment on the central portion 153. Preferably, each boundary wall 115 has a respective hole 115" in which the respective ends 151', 152' of the first portion 151 and the second portion 152, respectively, are inserted.

The hinge assembly 100 can be advantageously mounted in the eyewear 300.

The eyewear 300 comprises two hinge assemblies 100, each of which couples a respective temple 320 to the front 310.

In more details, the anchor element 110 is applied to the front 310, while the anchor box 120 is applied to the respective temple 320.

In case the eyewear 300 is of the smart eyewear type and the hinge assembly 100 comprises the retaining elastic element 150, the retaining elastic element 150 retains a portion of the flexible cable 200 against the anchor element 110.

In more details, the central portion 153 abuts on the flexible cable 200 so that during the rotation of the anchor box 120 and the at least one hinging member 130 with respect to the anchor element 110, or in other words, during the rotation of the temple 320, the flexible cable 200 is pushed against the anchor element 110 thanks to the preloaded twisting moment.

Therefore, the flexible cable 200 cannot be dragged in rotation by the temple 320.

Figure 13:
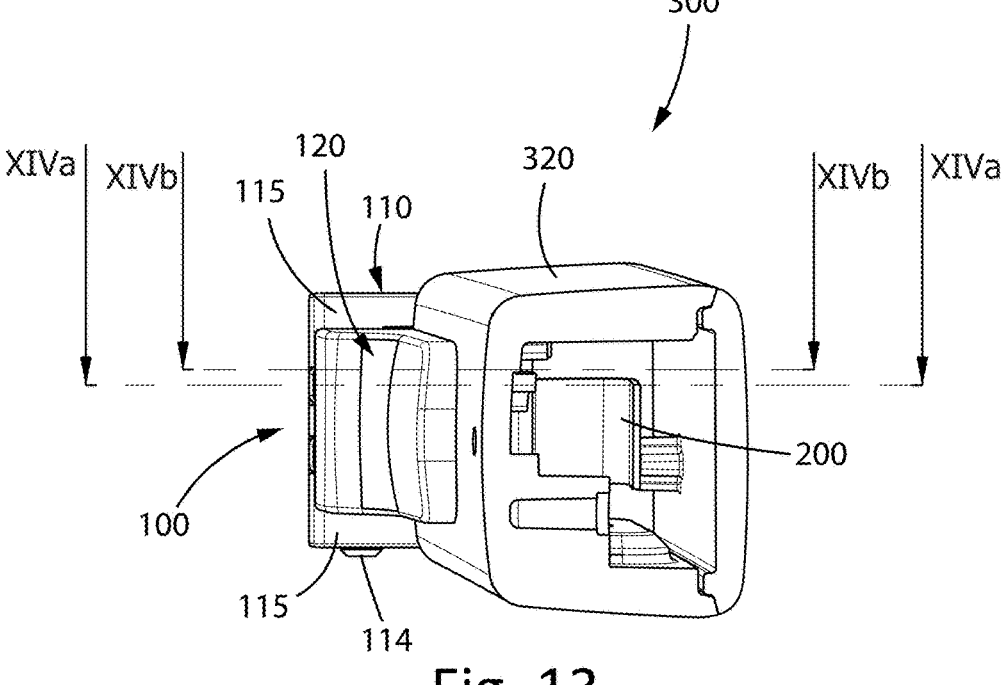
FIG. 13 is a partial front view of eyewear according to a third embodiment of the present disclosure.
Figures 14A, 14B:
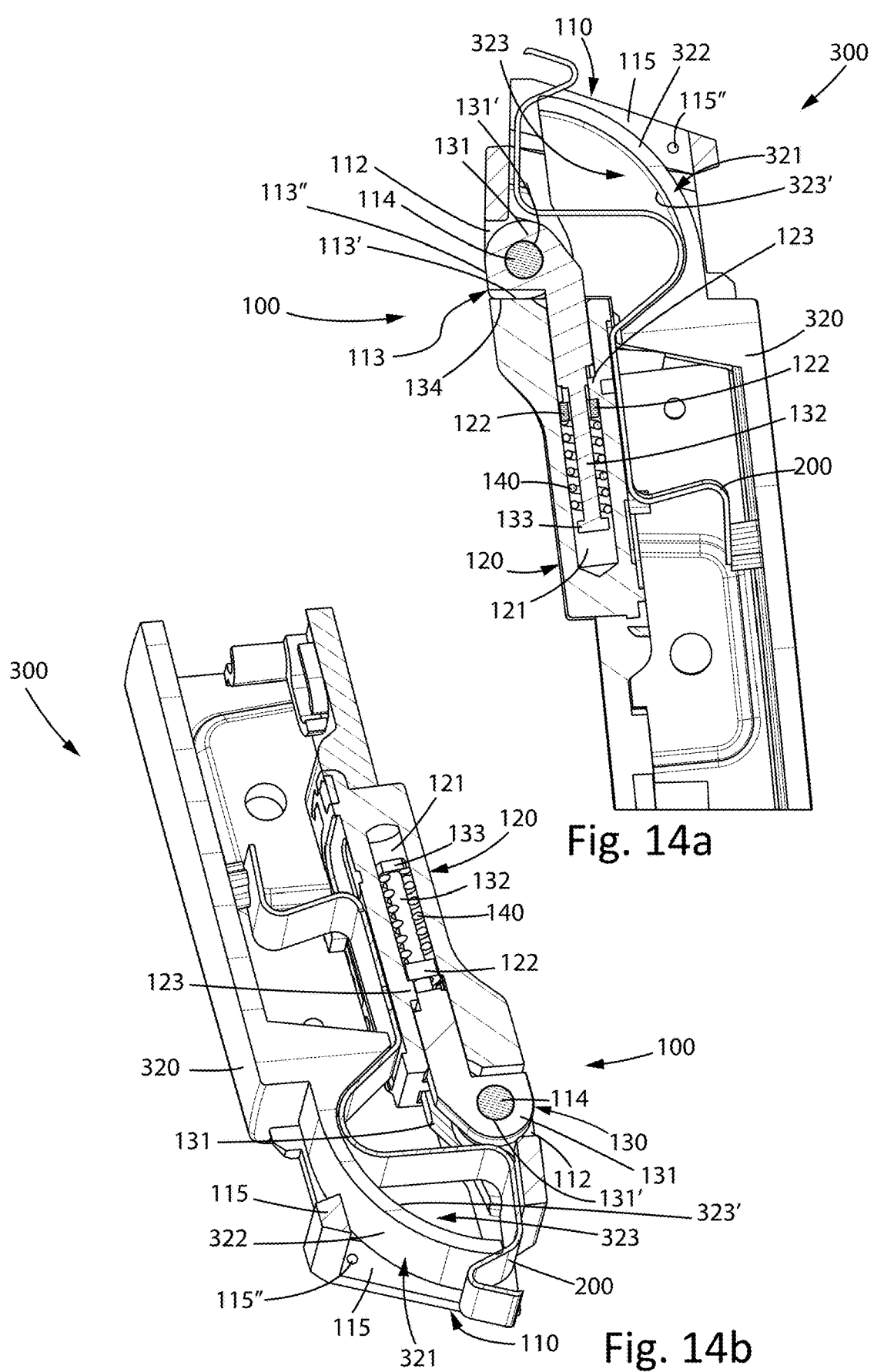
FIG. 14a, 14b are two sectional views respectively along the lines XIVa-XIVa, XIVb-XIVb of the hinge assembly of FIG. 13.

In case the eyewear 300 is of the smart eyewear type, according to a third embodiment shown in FIGS. 13-14_b_, each temple 320 comprises a respective covering element 321 configured to block and cover the flexible cable 200.

In particular, each covering element 321 is disposed at the respective end of the temple 320 facing the front 310.

Preferably, the cover element 321 is defined by a perimeter wall 322 that identifies a casing chamber 323.

When the hinge assembly 100 is in the first stable opening position the flexible cable 200 is housed in the casing chamber 323.

Moreover, when the hinge assembly 100 is in the first stable opening position, the flexibale cable 200 is at least partially in abutment on an inner surface 323' of the casing chamber 323.

In more details, the perimeter wall 322 is housed between the boundary walls 115 when the hinge assembly 100 is in the first stable opening position.

Therefore, the covering element 321 covers the flexible cable 200 in order that the flexible cable 200 cannot be seen from the exterior of the eyewear 300.

When the hinge assembly 100 passes from the first stable opening position to the second stable closing position, the covering element 321 rotates integrally 320 and the perimeter wall 322 with the temple progressivley exits the space identified between the boundary walls 115.

Therefore, when the hinge assembly 100 is in the second stable closing position, the flexible cable 200 is housed between the boundary walls 115 but it is not housed in the casing chamber 323.

However, the covering element 321 still covers the flexible cable 200 in order that the flexible cable 200 cannot be seen from the exterior of the eyewear 300, even if the hinge assembly 100 is in the second stable closing position.

The covering element 321 can be applied to the respective temple 320 or made in a single piece with the respective temple 320.

Figures 15, 16A:
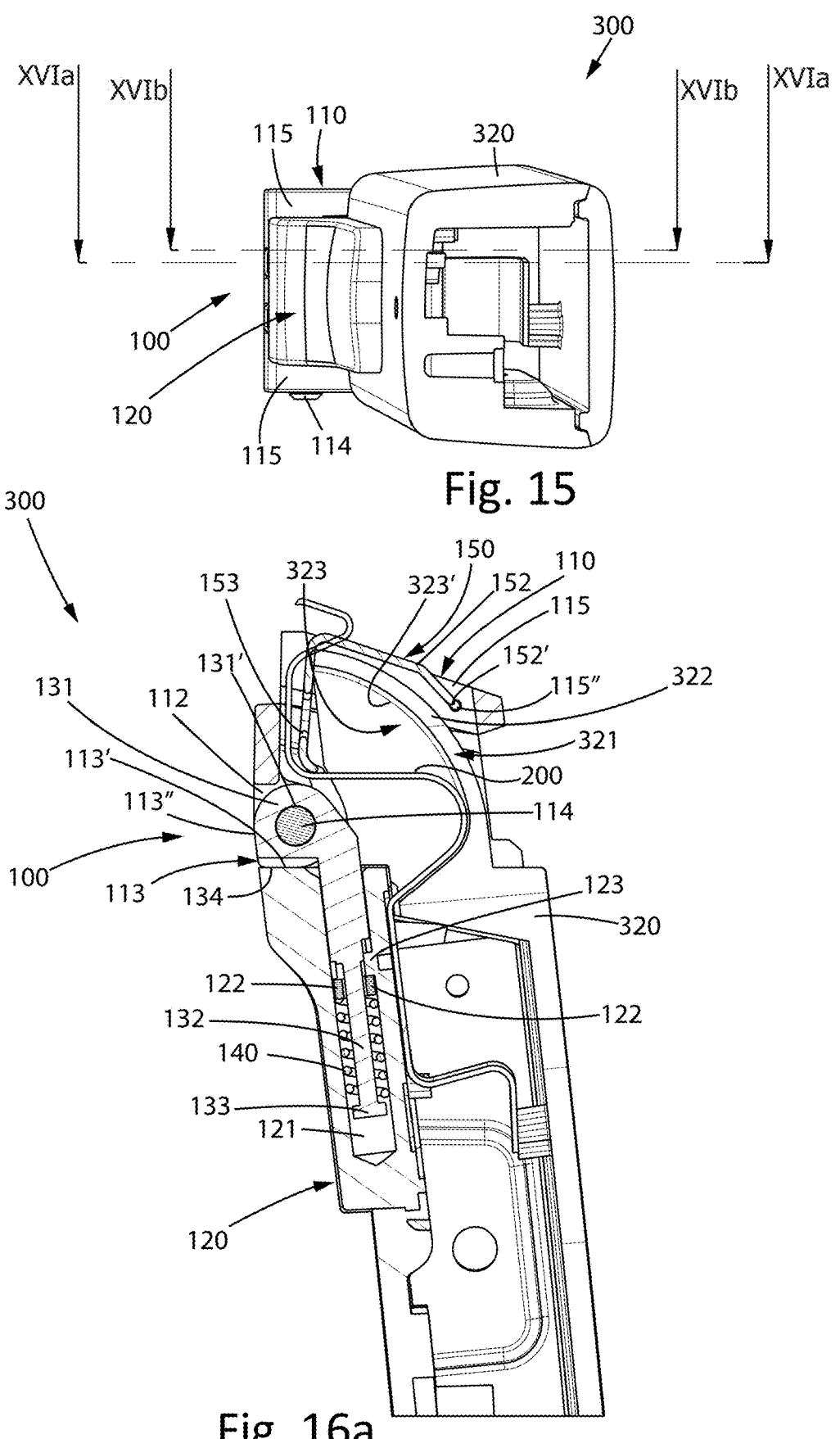
FIG. 15 is a partial front view of eyewear according to a fourth embodiment of the present disclosure.
FIG. 16a, 16b are two sectional view respectively along the lines XVIa-XVIa, XVIb-XVIb of the hinge assembly of FIG. 15.
Figure 16B:
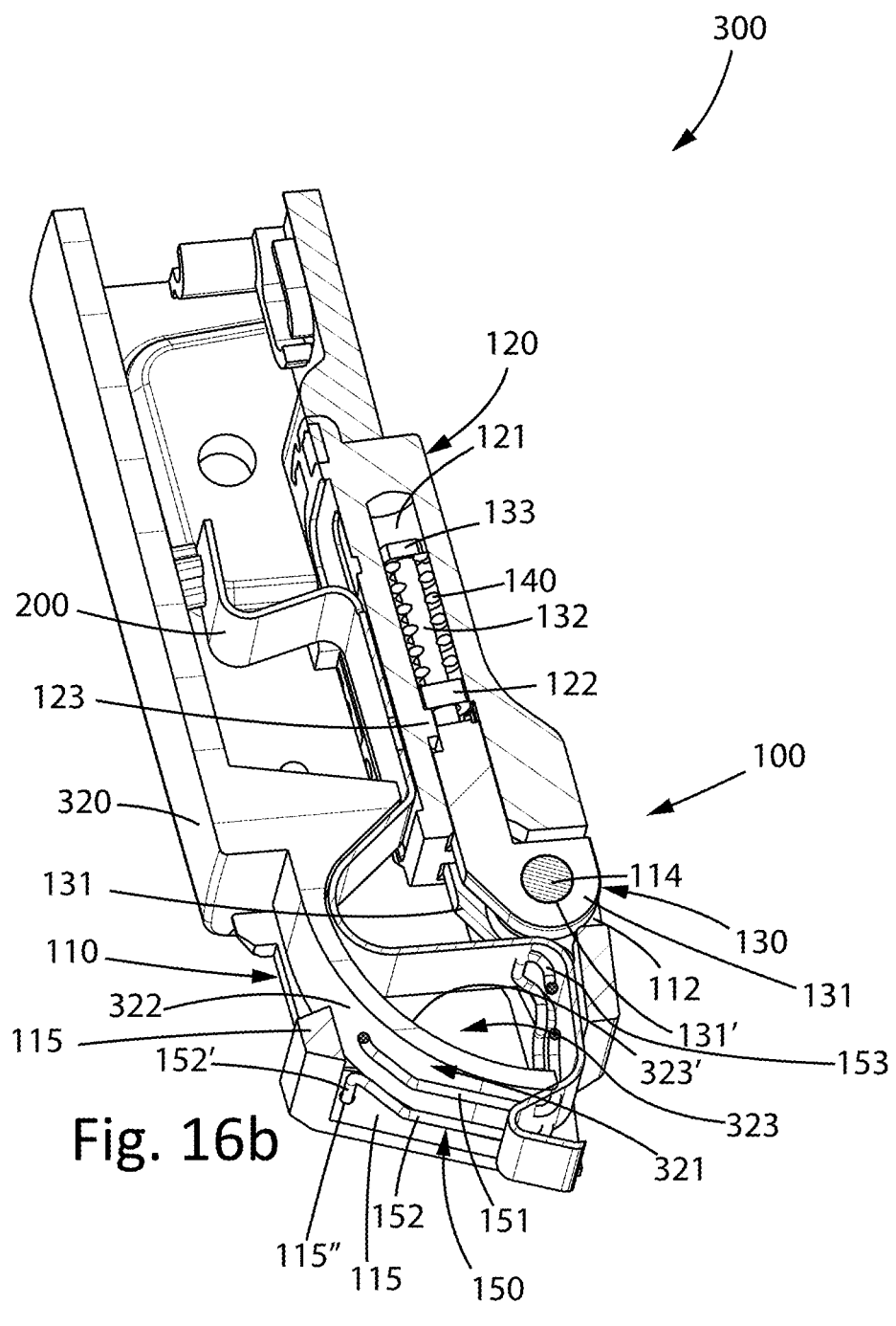

According to a fourth embodiment shown in FIGS. 15-17, the hinge assembly 100 comprises the retaining elastic element 150 and each temple 320 comprises the covering element 321.

In this case, as shown in FIGS. 16_a_-16_b_, the first portion 151 and the second portion 152 are outside the casing chamber 323 and are disposed in contact with the external surface of the perimeter wall 322, while the central portion 153 is housed in the casing chamber 323.

Preferably, the anchor element 110 is applied to the front 310 by means of gluing or overmolding.

More preferably, the coupling portion 11 is applied to the front 310 by means of gluing or overmolding.

Alternatively, the anchor element 110 is applied to the front 310 by means of one or more screw passing through the anchor element 110. Alternatively, the anchor element 110 is made in a single piece with the front 310.

Preferably, the anchor box 120 is applied to the respective temple 320 by means of gluing or overmolding.

Alternatively, the anchor box 120 is applied to the respective temple 320 by means of a screw coupling.

Alternatively, the anchor box 120 is made in a single piece with the respective temple 320.

According to a fifth embodiment as shown in FIGS. 18-24, and to a sixth embodiment as shown in FIGS. 26-32, the hinge assembly 100 comprises one hinging member 130 having two end portions 131, one shaft-like shaped portion 132 and one head portion 133.

The above characteristic improves the stability of the hinge assembly 100. Indeed, from one side, the hinging member 130 is rotatably coupled to the anchor element 110 by two end portions 131 protruding from the same body, and, from the other side, only one shaft-like shaped portion 132 is housed in the housing chamber 121, diminishing possible movements related to constructional clearance between the anchor box 120 and the hinging member 130.

Moreover, the hinge assembly 100 comprises one inner retaining member 122 and one elastic element 140.

In this case, the anchor box 120 comprises one housing chamber 121.

Each end portion 131 is rotatably coupled to the cantilevered portion 112 and, preferably, to one respective boundary wall 115.

In more detail, each end portion 131 is housed in the free space identified between the cantilevered portion 112 and one respective boundary wall 115.

In the fifth and in the sixth embodiment, preferably, the cantilevered portion 112 has the first cam 113 and each boundary wall 115 can have the second cam 116.

According to the sixth embodiment, each end portion 131 presents a protruding portion 131_a_. Each protruding portion 131_a_ extends from one lateral side of the respective end portion 131 towards the housing chamber 121 forming a respective notch 131_b_.

Figure 28A:
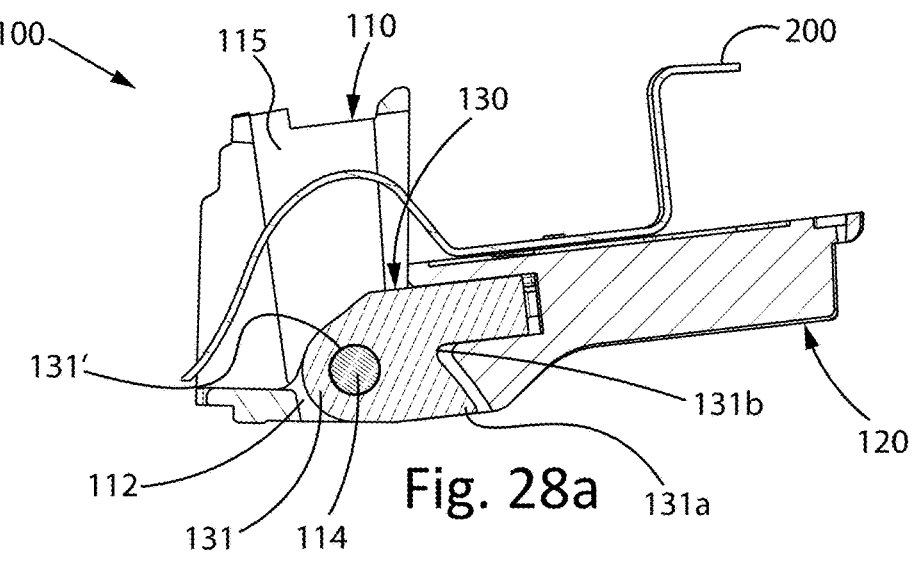
FIGS. 28a, 28b, 28c are three sectional views respectively along the lines XXVIIIa-XXVIIIa, XXVIIIb-XXVIIIb, XXVIIIc-XXVIIIc of the hinge assembly of FIG. 27.
Figure 28B:
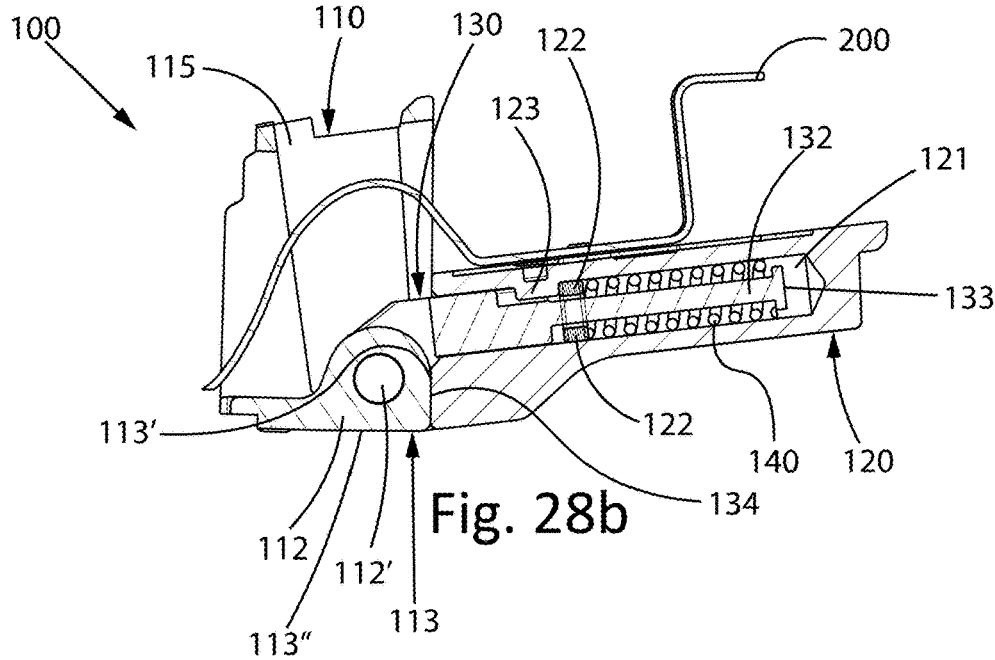
Figure 31A:
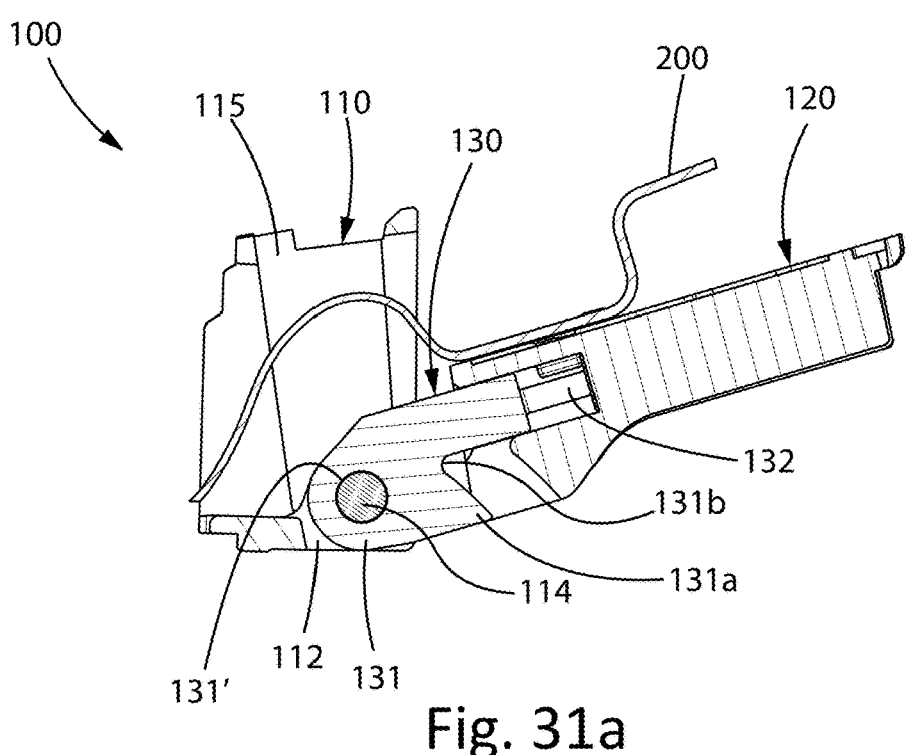
FIGS. 31a, 31b are two sectional views respectively along the lines XXXIa-XXXIa, XXXIb-XXXIb of the hinge assembly of FIG. 30.
Figure 31B:
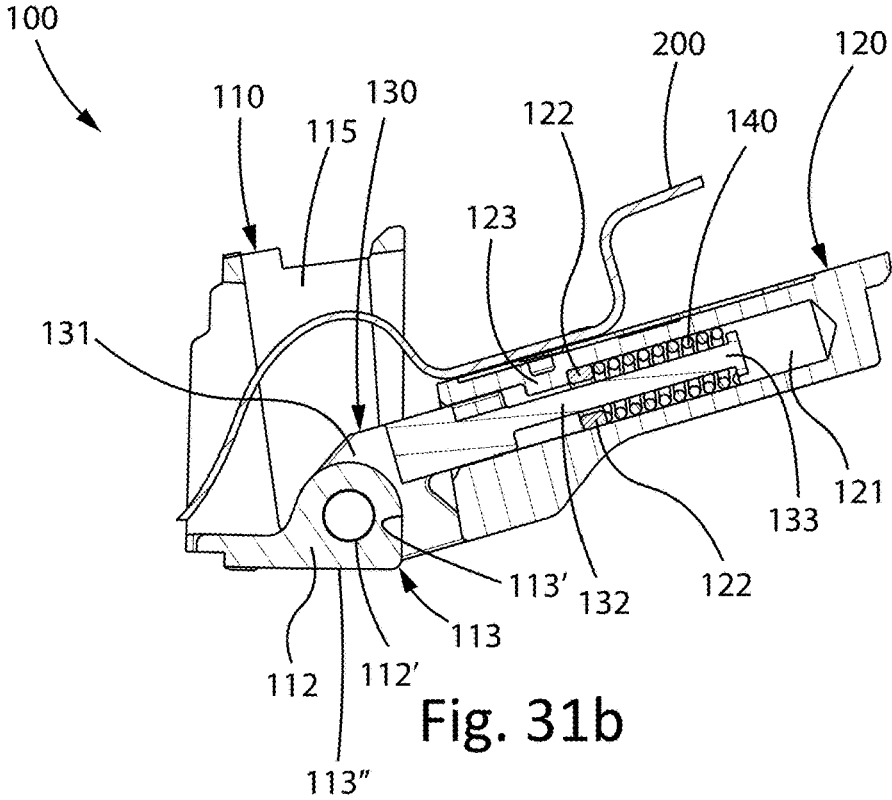
Figure 32:
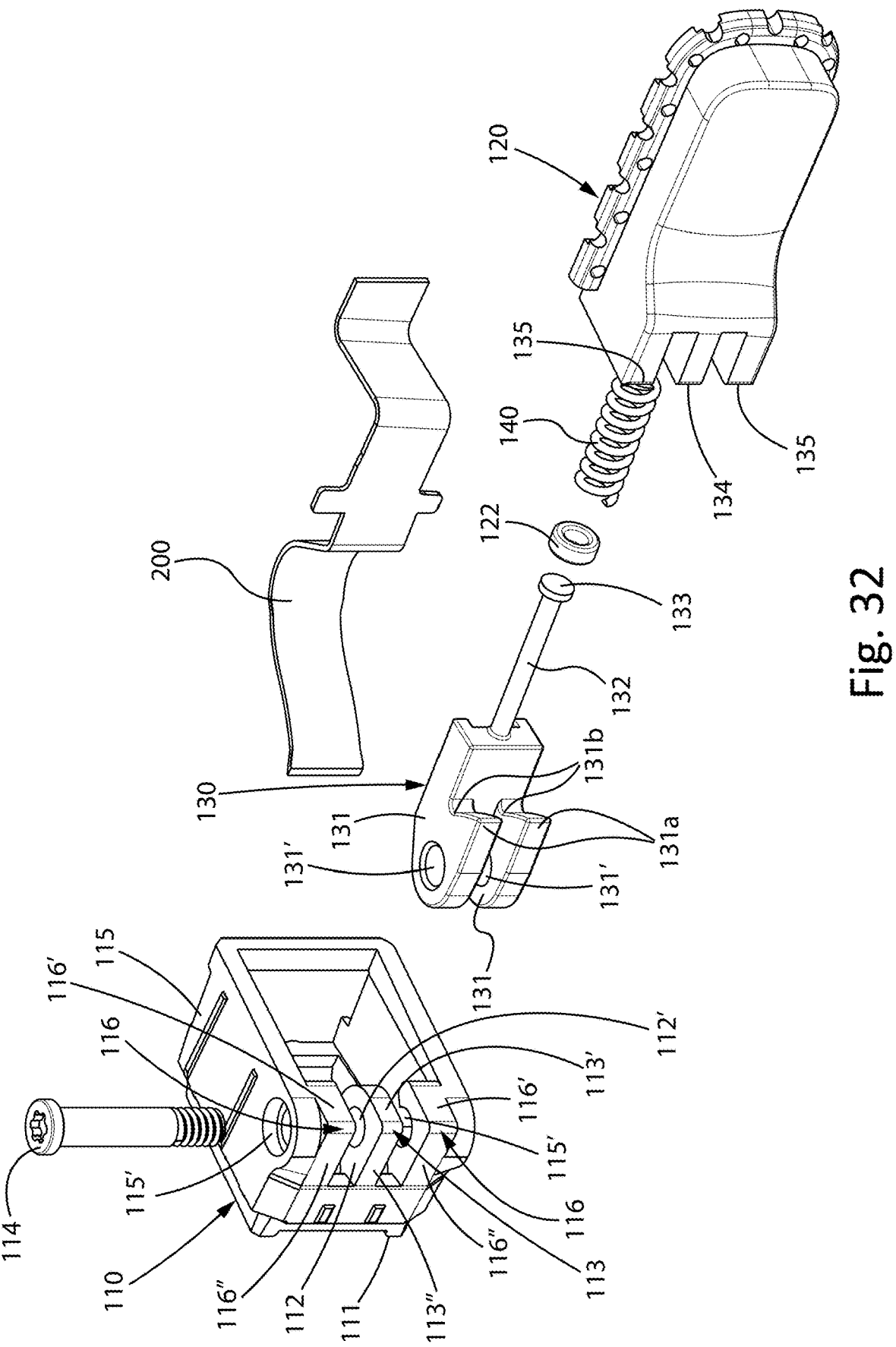
FIG. 32 is a prospective exploded view of a hinge assembly according to the sixth embodiment of the present disclosure.

Moreover, as shown in FIGS. 28a, 31a, the wall of the anchor box 120 facing each end portion 131 is shaped so as to project into the respective notch 131b.

Figure 28C:
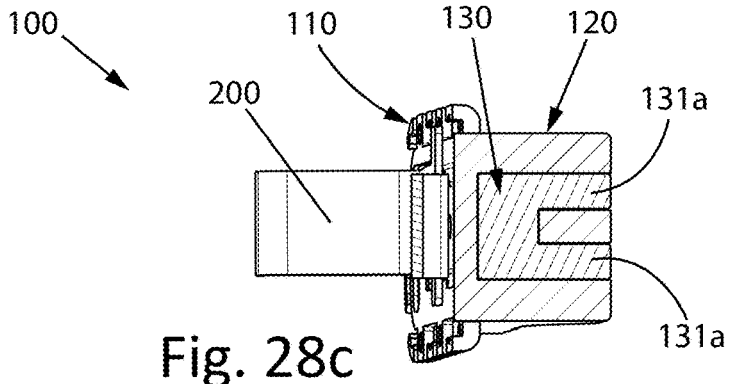
Figure 29:
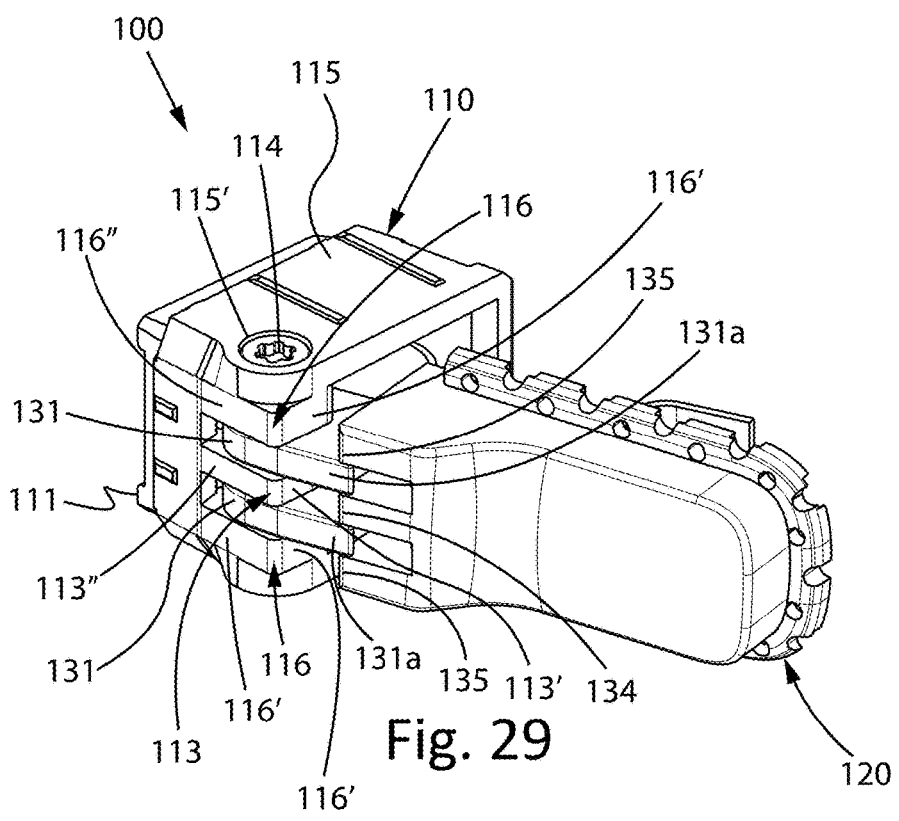
FIG. 29 is a prospective view of a hinge assembly according to the sixth embodiment of the present disclosure when it is in a third unstable overtravel position.
Figure 30:
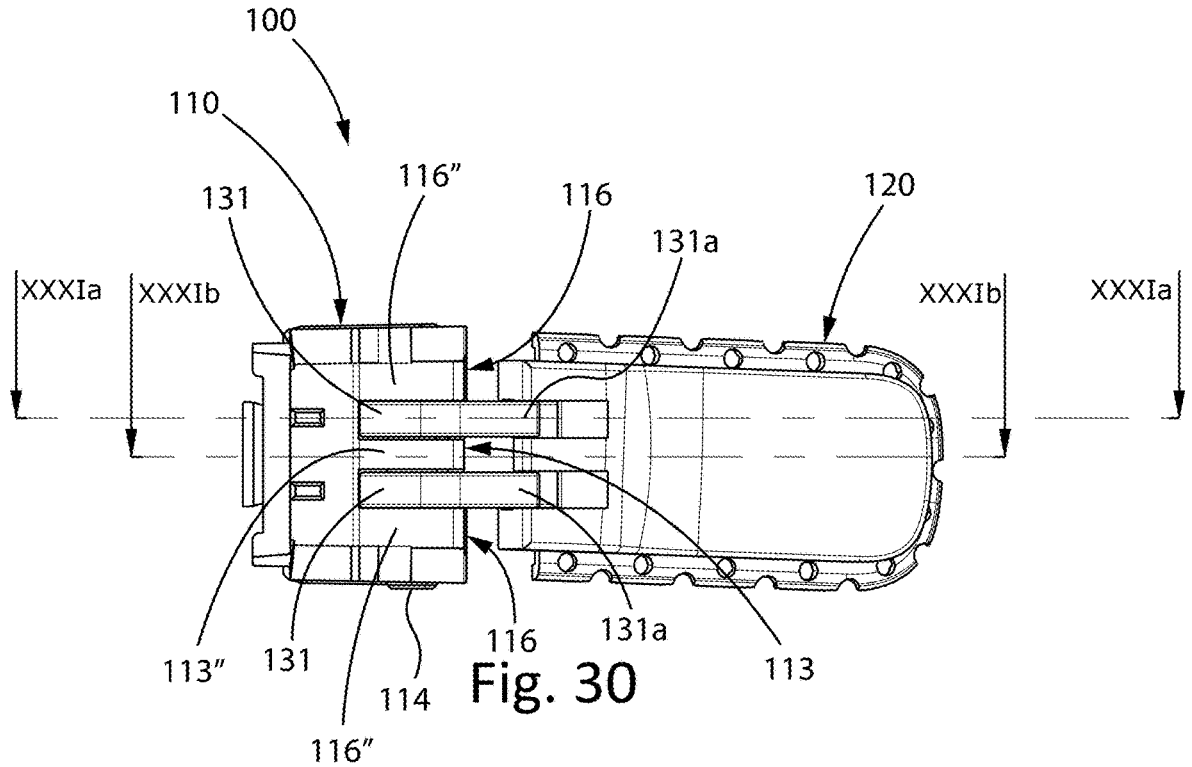
FIG. 30 is a lateral view of the hinge assembly of FIG. 29.

The protruding portions 131a enlarge the cross section of the hinging member 130, as shown for example from a comparison between FIGS. 20c, 28c.

Generally, due to the constructional clearance between the hinging member 130 and the housing chamber 121, the hinging member 130 can rotate about a rotational axis passing through the elastic element 140. This phenomenon is called "rocking". The degrees of "rocking" rotation depend on the distance between the rotational axis and the points of contact between the hinging member 130 and the housing chamber 121.

In the sixth embodiment, the points of contact between the hinging member 130 and the housing chamber 121 are further away from the rotational axis thanks to the protruding portions 131a which enlarge the cross section of the hinging member 130.

In this way, the protruding portions 131a allow to diminish the so called "rocking" phenomenon.

Figure 25:
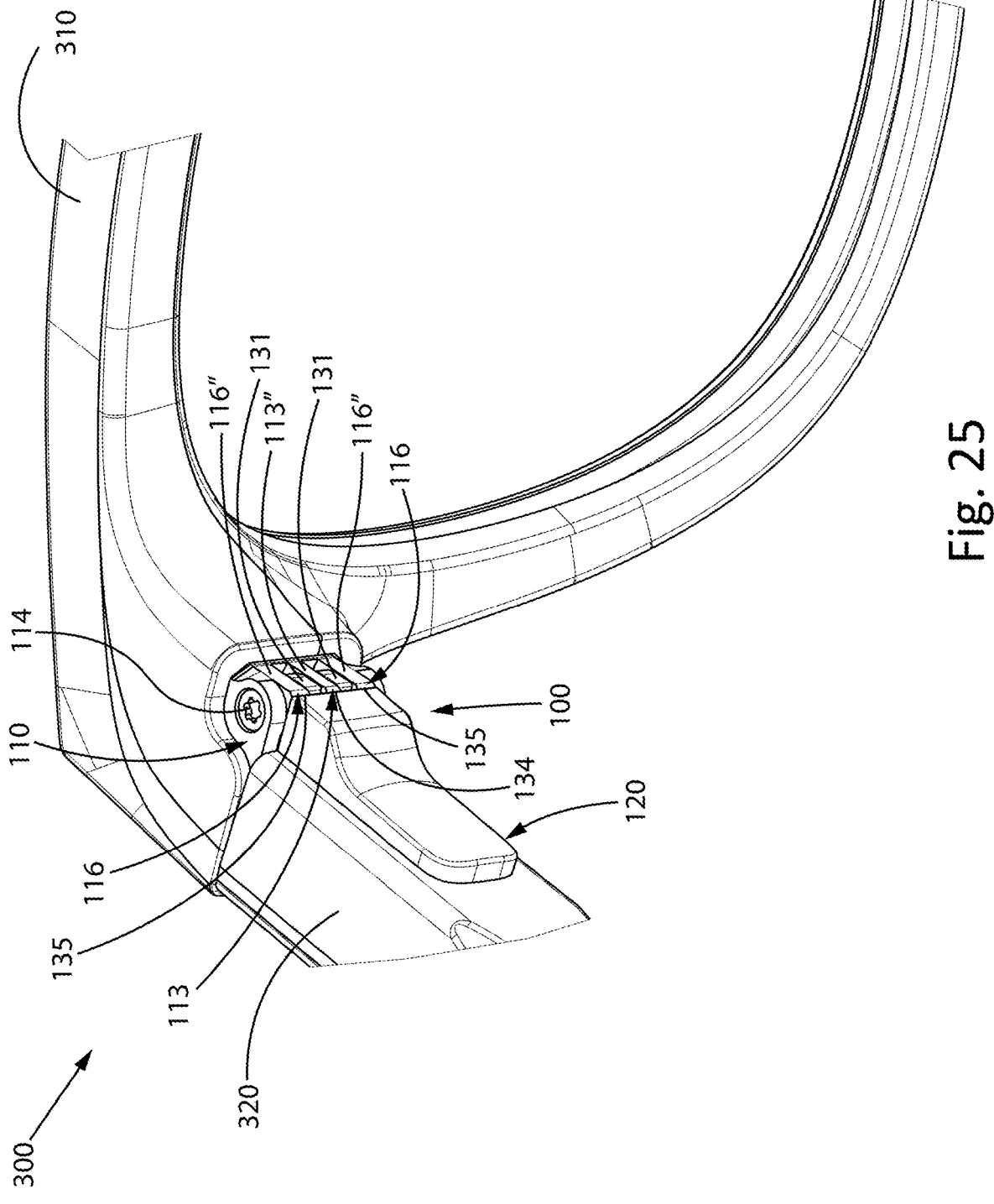
FIG. 25 is a partial prospective view of eyewear according to the present disclosure comprising the hinge assembly of FIGS. 18-24.
Figure 26:
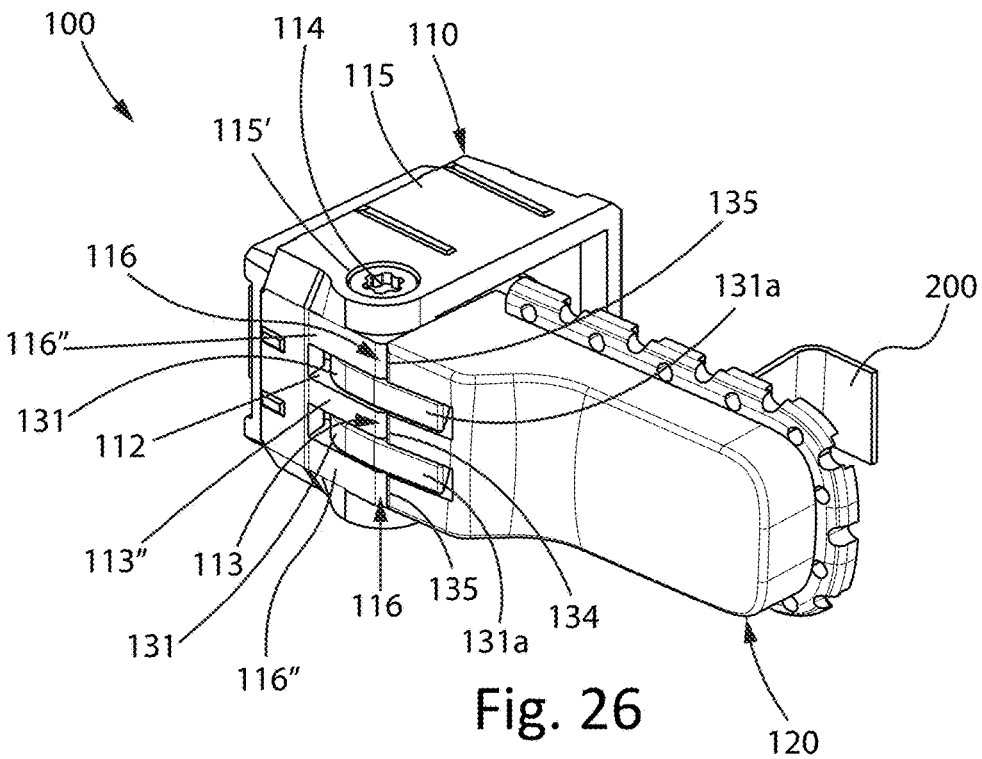
FIG. 26 is a prospective view of a hinge assembly according to a sixth embodiment of the present disclosure when it is in a first stable opening position.
Figure 27:
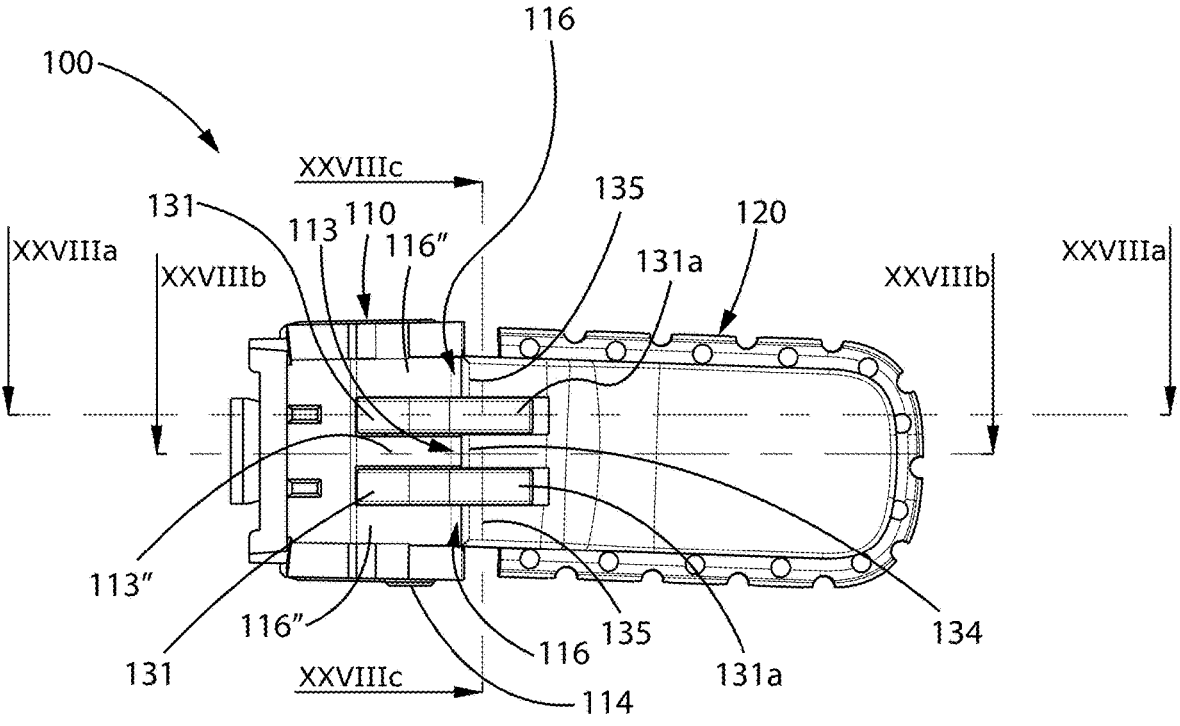
FIG. 27 is a lateral view of the hinge assembly of FIG. 26.
Figure 33:
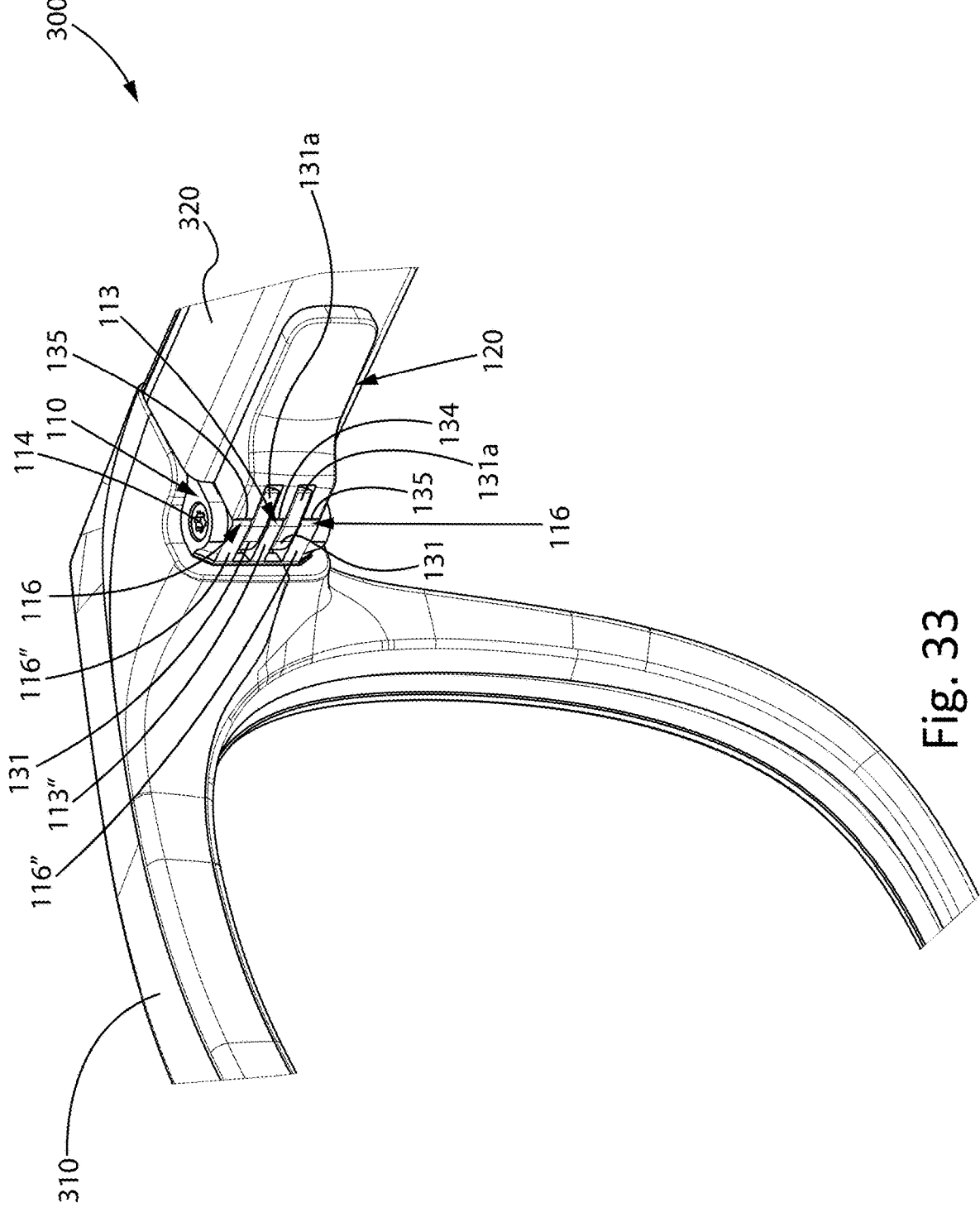
FIG. 33 is a partial prospective view of eyewear according to the present disclosure comprising the hinge assembly of FIGS. 26-32.

The hinge assembly 100 according to the fifth and the sixth embodiment can be advantageously mounted in a pair of eyewear as shown in FIGS. 25, 33. respectively.

The present disclosure also relates to a method for assembling the hinge assembly 100. The method comprises the steps:

providing the anchor element 110;
providing the anchor box 120;
providing the at least one hinging member 130;
passing the at least one respective shaft-like shaped portion 132 through the at least one respective elastic element 140 and through the respective inner retaining member 122 so that the at least one elastic element 140 is in contact, from one side, with the inner retaining member 122 and, from the other side, with the at least one head portion 133;
inserting the at least one shaft like shaped portion 132, the at least one head portion 133, the at least one elastic element 140 and the inner retaining member 122 in the at least one respective housing chamber 121;
shaping an outer wall of the housing chamber 121 in order to make the step-like shaped portion 123 so that the inner retaining member 122 is in abutment on the step-like shaped portion 123;
rotatably coupling the at least one end portion 131 to the anchor element 110.

Therefore, the anchor box 120 is coupled to the at least one hinging member 130 and the at least one hinging member 130 is coupled to the anchor element 110.

From the description made, the characteristics of the hinge assembly for eyewear, the eyewear comprising such a hinge assembly and the method for assembling such a hinge assembly, object of the present disclosure, are clear, as are the relative advantages.

Indeed, the bistable and flexible hinge assembly is simple, light, thus reducing the risk of damage and/or failure of the latter.

Moreover, in the case in which the hinge assembly is integrated in a pair of smart eyewear, the hinging elements allow to accommodate, in a secure manner, the flexible cable without increasing the overall dimension of the hinge assembly.

Finally, it is clear that the hinge assembly for eyewear, the eyewear comprising such a hinge assembly and the method for assembling such a hinge assembly thus conceived are of numerous susceptible modifications and variations, all of which are within the scope of the disclosure; moreover, all the details may be replaced by technically equivalent elements. In practice, the materials used, as well as their dimensions, can be of any type according to the technical requirements.

The invention claimed is:

1. A hinge assembly for eyewear comprising:
an anchor element configured to be applied to a front of the eyewear;
an anchor box configured to be applied to a temple of the eyewear, said anchor box comprising at least one housing chamber opened towards the outside and facing the anchor element, said at least one housing chamber having an inner retaining member;
at least one hinging member having at least one end portion rotatably coupled to the anchor element and at least one shaft shaped portion extending towards the opposite side with respect to the at least one end portion, said at least one shaft shaped portion ending with at least one head portion being at least partially housed in at least one respective housing chamber;
at least one elastic element being passed through by at least one respective shaft shaped portion and being, from one side, in contact with the inner retaining member and, from the other side, in contact with the at least one head portion;
wherein the hinge assembly can reversibly pass from a first stable opening position to a second stable closing position and vice versa and from the first stable opening position to a third unstable overtravel position and vice versa,
wherein each end portion presents a protruding portion, each protruding portion extending from one lateral side of the respective end portion towards said housing chamber forming a respective notch.

2. The hinge assembly according to claim 1, wherein said anchor element comprises a coupling portion and at least one cantilevered portion extending towards the opposite side with respect to the coupling portion, said at least one end portion being rotatably coupled to the at least one cantilevered portion, said at least one cantilevered portion comprising at least one first cam and the anchor box comprising at least one first guiding end that faces the at least one cantilevered portion and that is configured to slide on the at least one first cam when the hinge assembly passes from the first stable opening position to the second stable closing position or vice versa, said at least one first cam being shaped so that during the passage between the first stable opening position to the second stable closing position and vice versa, the interaction between the at least one first guiding end and the at least one first cam causes that the at least one head portion and the inner retaining member in a first phase approach to each other compressing the at least one elastic element and, in a subsequent second phase, move away from each other relaxing the at least one elastic element,
and wherein during the passage from the first stable opening position to the third unstable overtravel position the at least one first guiding end moves away from the at least one first cam and the at least one head portion and the inner retaining member approach to each other compressing the at least one elastic element.

3. The hinge assembly according to claim 2, wherein said at least one first cam comprises a first endstroke abutment surface and a second endstroke abutment surface, said at least one first guiding end and said first endstroke abutment surface are configured to identify the first stable opening position when they are in abutment one on the other, the at least one first guiding end and the second endstroke abutment surface are configured to identify the second stable closing position when they are in abutment one on the other.

4. The hinge assembly according to claim 2, wherein the at least one cantilevered portion has a first through hole, said at least one end portion having a second through hole arranged at said first through hole, said hinge assembly comprising a pin housed in said first through hole and in the second through hole, said a first hinging axis being defined by said pin.

5. The hinge assembly according to claim 2, wherein said anchor element comprises two boundary walls substantially parallel to said at least one cantilevered portion, said at least one end portion being rotatably coupled also to the boundary walls.

6. The hinge assembly according to claim 5, wherein each one of said boundary walls comprises a respective second cam, and said anchor box comprises two second guiding ends each one of which faces a respective second cam, the respective second cam being shaped as the at least one first cam.

7. The hinge assembly according to claim 5, wherein a retaining elastic element is a torsion spring having a first portion coupled to one boundary wall, a second portion opposite to the first portion coupled to the other boundary wall, and a central portion connecting the first portion and the second portion, said first portion and said second portion exerting a preloaded twisting moment on the central portion.

8. The hinge assembly according to claim 1, wherein inner walls of the at least one respective housing chamber comprise a step shaped portion and the inner retaining member is a bush passed through by the at least one shaft shaped portion and in abutment on the step shaped portion.

9. The hinge assembly according to claim 1, wherein the at least one housing chambers, the at least one hinging members and the at least one elastic elements are in number equal to two respectively.

10. The hinge assembly according to claim 1, comprising one said hinging member having two said end portions, one said shaft shaped portion and one said head portion.

11. The hinge assembly according to claim 1, comprising a retaining elastic element housed in and coupled to the anchor element, said retaining elastic element being configured to retain a portion of a flexible cable against said anchor element.

12. Eyewear comprising:
a front adapted to carry at least one lens, and two temples;
two hinge assemblies each of which couples a respective temple to said front, wherein each hinge assembly comprises:
  an anchor element applied to said front of said eyewear;
  an anchor box applied to said temple of said eyewear, said anchor box comprising at least one housing chamber opened towards the outside and facing the anchor element, said at least one housing chamber having an inner retaining member;
  at least one hinging member having at least one end portion rotatably coupled to the anchor element and at least one shaft shaped portion extending towards the opposite side with respect to the at least one end portion, said at least one shaft shaped portion ending with at least one head portion being at least partially housed in at least one respective housing chamber;

at least one elastic element being passed through by the at least one respective shaft shaped portion and being, from one side, in contact with the inner retaining member and, from the other side, in contact with the at least one head portion;
wherein the hinge assembly can reversibly pass from a first stable opening position to a second stable closing position and vice versa and from the first stable opening position to a third unstable overtravel position and vice versa,
wherein each end portion presents a protruding portion, each protruding portion extending from one lateral side of the respective end portion towards said housing chamber forming a respective notch.

13. The eyewear according to claim 12, further comprising a flexible cable which is adapted to electrically connect to each other electric or electronic devices integrated in the front and in the temples.

14. The eyewear according to claim 13, wherein each temple comprises a respective covering element configured to block and cover said flexible cable, said covering element being defined by a perimeter wall that identifies a casing chamber, when the hinge assembly is in the first stable opening position the flexible cable is housed in said casing chamber and is at least partially in abutment on an inner surface of said casing chamber.

15. The eyewear according to claim 13, wherein said hinge assembly comprises a retaining elastic element housed in and coupled to the anchor element, said retaining elastic element retaining a portion of the flexible cable against said anchor element.

16. A method for assembling a hinge assembly, the method comprising the following steps:
providing an anchor element configured to be applied to a front of eyewear;
providing an anchor box configured to be applied to a temple of the eyewear, said anchor box comprising at least one housing chamber opened towards the outside;
providing at least one hinging member having at least one end portion and at least one shaft shaped portion, said at least one shaft shaped portion ending with at least one head portion, wherein each end portion presents a protruding portion, each protruding portion extending from one lateral side of the respective end portion towards said housing chamber forming a respective notch;
passing the at least one respective shaft shaped portion through at least one respective elastic element and through a respective inner retaining member so that the at least one elastic element is in contact, from one side, with the inner retaining member and, from the other side, with the at least one head portion;
inserting the at least one shaft shaped portion, the at least one head portion, the at least one elastic element and the inner retaining member in the at least one respective housing chamber;
shaping an outer wall of the housing chamber in order to make a step shaped portion of the inner walls of the at least one housing chamber so that the inner retaining member is in abutment on the step shaped portion; and
rotatably coupling the at least one end portion to the anchor element.

* * * * *